US012698011B2

(12) United States Patent
Zhu et al.

(10) Patent No.: US 12,698,011 B2
(45) Date of Patent: Aug. 4, 2026

(54) SYSTEMS AND METHODS FOR DISENGAGING OR ENGAGING AUTONOMY REMOTELY

(71) Applicant: Zoox, Inc., Foster City, CA (US)

(72) Inventors: Yongguang Zhu, Yorktown, VA (US); Collin MacGregor, Redwood City, CA (US); Ravi Gogna, San Jose, CA (US); Meredith James Goldman, Redwood City, CA (US); Muhammad Umar Choudry, Seattle, WA (US)

(73) Assignee: Zoox, Inc., Foster City, CA (US)

( * ) Notice: Subject to any disclaimer, the term of this patent is extended or adjusted under 35 U.S.C. 154(b) by 500 days.

(21) Appl. No.: 18/076,300

(22) Filed: Dec. 6, 2022

(65) Prior Publication Data

US 2024/0182083 A1     Jun. 6, 2024

(51) Int. Cl.
B60W 60/00 (2020.01)
B60W 50/02 (2012.01)
G05D 1/00 (2006.01)

(52) U.S. Cl.
CPC ...... B60W 60/005 (2020.02); B60W 50/0205 (2013.01); B60W 60/0015 (2020.02); G05D 1/0011 (2013.01)

(58) Field of Classification Search
CPC ........... B60W 60/005; B60W 50/0205; B60W 60/0015; G05D 1/0011; G05D 1/22
See application file for complete search history.

(56) References Cited

U.S. PATENT DOCUMENTS

| | | | | |
|---|---|---|---|---|
| 11,079,753 | B1 * | 8/2021 | Roy ...................... | G05D 1/0038 |
| 2018/0050704 | A1 * | 2/2018 | Tascione ............. | G07C 5/0808 |
| 2018/0373239 | A1 * | 12/2018 | Tsubota ............... | G05D 1/0033 |
| 2019/0118792 | A1 * | 4/2019 | Malone ................. | B60W 10/18 |
| 2019/0212732 | A1 * | 7/2019 | Takanashi ............ | G05D 1/0061 |
| 2020/0110406 | A1 * | 4/2020 | Krishnamurthy ... | B60W 50/045 |
| 2020/0333778 | A1 * | 10/2020 | Lambert .............. | G05D 1/0038 |
| 2021/0362746 | A1 * | 11/2021 | Choi ..................... | B60W 50/14 |
| 2022/0126878 | A1 * | 4/2022 | Moustafa .............. | B60W 40/09 |
| 2023/0195135 | A1 * | 6/2023 | Kote ............... | B60W 60/00253 701/23 |
| 2024/0048949 | A1 * | 2/2024 | Huang ................... | H04L 43/10 |
| 2024/0149892 | A1 * | 5/2024 | Arun ............... | B60W 60/00186 |

* cited by examiner

*Primary Examiner* — Anne Marie Antonucci
*Assistant Examiner* — Jordan T Smith
(74) *Attorney, Agent, or Firm* — Lee & Hayes, P.C.

(57) ABSTRACT

Systems and methods for disengaging or engaging autonomy remotely are provided. The autonomous vehicle may receive a request from a remote computing system associated with a remote operator. The request may require the autonomous vehicle to disengage, engage, or re-engage autonomy. The autonomous vehicle may determine whether the request is valid, and whether certain safety criteria are met. Upon determining that the request is valid and safety criteria are met, the autonomous vehicle may process the request and cause the autonomous vehicle to enter the desired state. The autonomous vehicle may send a message to the remote computing system, indicating whether or not the autonomous vehicle has entered the desired state.

20 Claims, 11 Drawing Sheets

200

RECEIVE A DISENGAGE REQUEST FROM THE REMOTE COMPUTING SYSTEM
208

204

- IN AUTONOMY
- ON A MISSION

206

202

RECEIVE GUIDANCE FROM THE REMOTE COMPUTING SYSTEM
210

PARKING SPOT 212

202

CHECK CONDITIONS
214

VEHICLE CONTROL SYSTEM 216

DRIVE MANAGEMENT COMPONENT 218
- ENGAGE AUTONOMY
- DISENGAGE AUTONOMY

TO 220 OR 224

200

FROM
214

REJECT DISENGAGE REQUEST IF
THE CONDITIONS ARE NOT MET
220

PERFORM DISENGAGEMENT OF
AUTONOMY IF THE CONDITIONS
ARE MET
224

SEND FEEDBACK MESSAGE TO
REMOTE COMPUTING SYSTEM
222

SEND CONFIRMATION MESSAGE
TO REMOTE COMPUTING SYSTEM
226

204

- FEEDBACK MESSAGE
- CONFIRMATION MESSAGE

202

400 ⟶

RECEIVE A MISSION FROM THE REMOTE COMPUTING SYSTEM
406

404

402

- NOT IN AUTONOMY
- NOT ON A MISSION

RECEIVE AN ENGAGE REQUEST FROM THE REMOTE COMPUTING SYSTEM
408

402

404

412

410

CHECK CONDITIONS
414

VEHICLE CONTROL SYSTEM 416

DRIVE MANAGEMENT COMPONENT 418
- ENGAGE AUTONOMY
- DISENGAGE AUTONOMY

TO 420 OR 424

400 ⇘

700

SYSTEMS AND METHODS FOR DISENGAGING OR ENGAGING AUTONOMY REMOTELY

BACKGROUND

An autonomous vehicle may navigate along designated routes or between waypoints. For example, when a control system receives a request from a user device to pick up the user at a location and provide transport to a destination location, the autonomous vehicle may receive, from the control system, instructions to navigate from the pickup location to the destination location. To perform the instructions, autonomous functions of the vehicle may need to be engaged (e.g., activated). While performing the instructions, the autonomous vehicle may encounter a condition that requires additional assistance from a remote source, such as a teleoperator. To be controlled by the removed source, the autonomous vehicle may have to disengage (deactivate) autonomy, and subsequently reengage autonomy, e.g., once the vehicle has navigated or otherwise cleared the condition.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
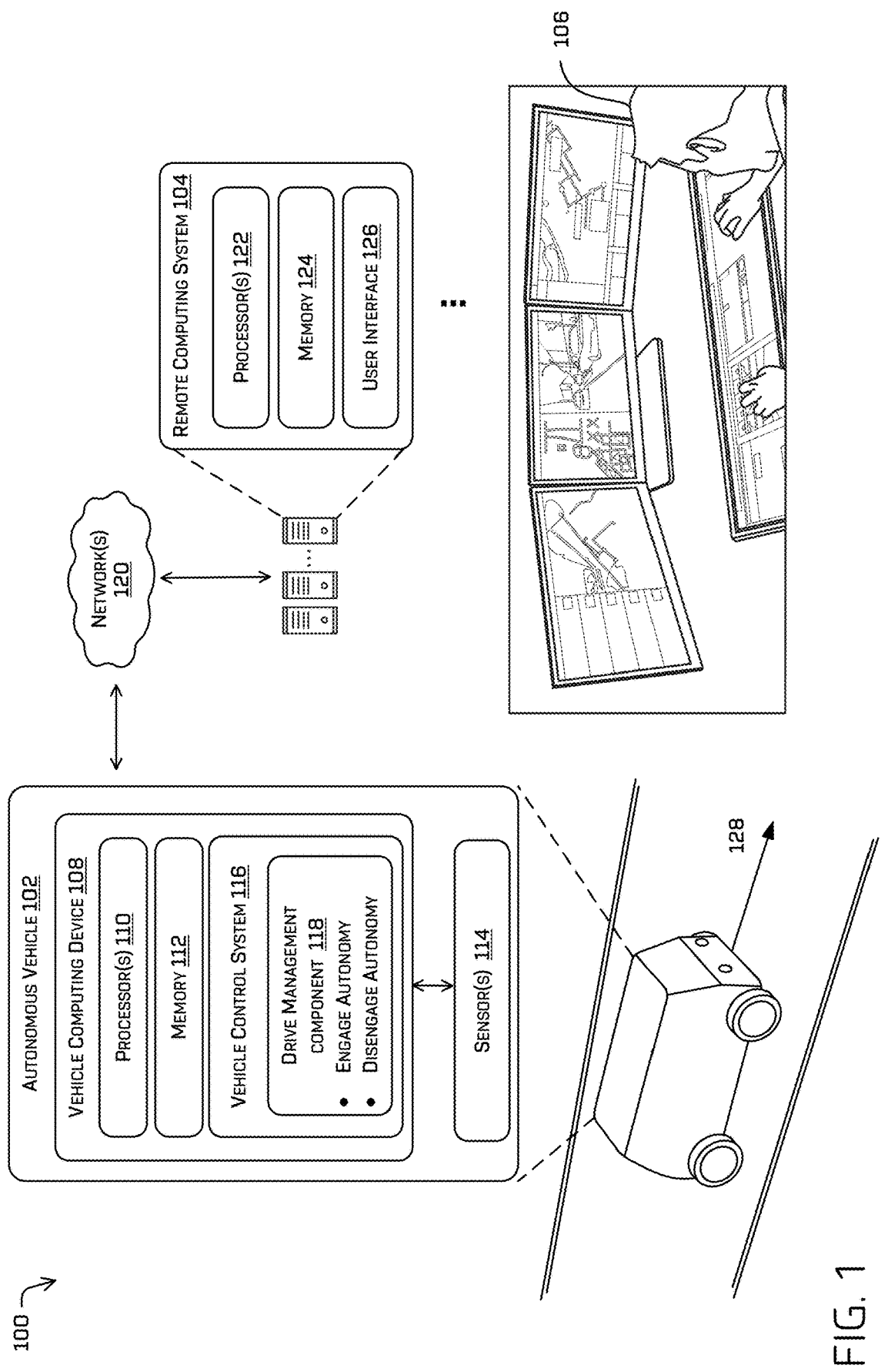
FIG. 1 illustrates an example environment that includes an autonomous vehicle which can communicate with a remote computing system associated with a teleoperator, in accordance with embodiments of the disclosure.

As discussed above, an autonomous vehicle may perform various operations such as navigating from a pickup location to a destination location or, as otherwise referred to herein, as executing a mission. The mission can include a series of tasks, vehicle maneuvers, or the like. In some instances, the vehicle may be in autonomy (e.g., functioning autonomously) while on the mission, and a teleoperator may request disengagement of autonomy of the vehicle for operational reasons. In other circumstances, the vehicle may be in autonomy but not on a current mission, e.g., the autonomous vehicle may have completed a previous mission, may be awaiting instructions associated with a new mission, or the like, and the teleoperator may request disengagement of autonomy (deactivation of at least a portion of autonomous functionality) of the vehicle for operational reasons. In some instances, the vehicle may be not in autonomy and not on a mission, and the teleoperator may request the vehicle to engage autonomy (activate at least a portion of autonomous functionality) and perform a mission. In some circumstances, the mission of the vehicle may be interrupted and the vehicle may disengage autonomy, but the teleoperator may request the vehicle to re-engage autonomy to continue the mission. In some circumstances, the systems may require a person to be at the vehicle, either an operator in or proximate to the current test vehicles, or a technician or similar person at a fleet management location. It can be problematic to have a person go to a vehicle in the field that is having issues. Therefore, it may be desired to have a remote engage/disengage option. Techniques discussed herein may enable the teleoperators to engage and/or disengage autonomy on vehicles remotely.

Throughout this disclosure, engagement of autonomy may refer to an action that puts an autonomous vehicle in an autonomous drive state or at least partially activates certain autonomous functionality associated with the vehicle. Disengagement of autonomy may refer to an action that causes an autonomous vehicle to exit the autonomous drive state or at least partially deactivates certain autonomous functionality associated with the vehicle. For instance, while autonomy is disengaged, an operator may control the autonomous vehicle directly. e.g., by causing the autonomous vehicle to move. In other examples, however, while autonomy is disengaged, some or all functioning of the vehicle may be disabled. Re-engagement of autonomy may refer to an action that configures an autonomous vehicle in the autonomous drive state again after disengagement. The example vehicle can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle can be configured to control all functions from start to completion of the trip, including all parking functions, it may not include a driver and/or controls for driving the vehicle, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

An autonomous vehicle may receive a request from a remote computing system associated with a remote operator, to transition between a first state and a second state. The request can be a disengage request, an engage request, or a re-engage request. The first state can be associated with at least a portion of autonomous functionality associated with the vehicle being active. The second state can be associated with the portion of autonomous functionality being inactive.

The autonomous vehicle may determine whether the request is valid, and whether the autonomous vehicle meets a set of safety criteria. Upon determining that the request is valid and the set of safety criteria is met, the autonomous vehicle can transition between the first state and the second state. The autonomous vehicle may send a first message to the remote computing system indicating whether the autonomous vehicle has transitioned from the first state to the second state. The autonomous vehicle can operate in accordance with the second state.

In some examples, the safety criteria can include, but are not limited to, the autonomous vehicle being stopped, the autonomous vehicle being in a location with network connectivity, the autonomous vehicle being in a map area where engagement/disengagement is allowed, the autonomous vehicle being in a map area where engagement/disengagement is safe, the autonomous vehicle being in a location where the traffic is relatively low, the autonomous vehicle being at a time when engagement/disengagement is safe, or the like. In some examples, the autonomous vehicle may run a cyclic redundancy check (CRC) on the data included in the disengage request to determine whether the disengage request is valid. CRC can be used to validate the data in the disengage request to make sure that the data in the disengage request is not corrupted during transmission. In some examples, the identifications (IDs) of the authentic teleoperator computing system can be stored in the autonomous vehicle.

In some examples, when the request can be an engage request, the autonomous vehicle may further determine whether there are faults that prevent the vehicle from engaging autonomy. For example, faults that prevent autonomy can include but are not limited to, a planner of the autonomous vehicle being unfunctional, an electronic drive of the autonomous vehicle being not available, a braking system of the autonomous vehicle being unfunctional, or the like. In some examples, the autonomous vehicle can receive, from the remote computing system, instructions for solving the faults, and perform operations to resolve the faults. The teleoperator can determine how to solve the faults and send instructions to the autonomous vehicle. For example, when the planner of the autonomous vehicle is unfunctional, the teleoperator can send instructions to the autonomous vehicle to restart the planner. The autonomous vehicle can follow the instructions from the teleoperator and solve the faults. After the faults are resolved, the autonomous vehicle can send a feedback message to the remote computing system, the feedback message indicating that the faults are resolved.

The autonomous vehicle can communicate the status of the request back to the teleoperator. In some examples, the vehicle control system of the autonomous vehicle can have a reaction time to publish the feedback. In some examples, the feedback can be used for the teleoperator awareness purposes. In some examples, upon determining that the request is not valid or the vehicle does not meet a set of safety criteria, the autonomous vehicle may reject the request and send a feedback message to the remote computing system. The feedback message may indicate a reason why the request is rejected. For example, the feedback message may indicate that reason why the request is rejected is that the request is not valid, or that the vehicle does not meet the set of safety criteria. As another example, the feedback message may indicate that reason why the disengage request is rejected is that the vehicle does not meet the set of safety criteria. In at least some examples, such feedback may further comprise sensor information, vehicle state information (e.g., position, velocity, state of charge, whether executing a mission, etc.), vehicle component/subcomponent status messages (temperature readings, voltage readings, measured output signals, statuses, etc.), or the like.

In some examples, when the autonomous vehicle receives the request while the autonomous vehicle is in motion, the autonomous vehicle may receive a guidance message from the remote computing system. The guidance message can include information that guides the autonomous vehicle to park at a parking spot or a pick-up or drop-off location. The autonomous vehicle can park at the parking spot or the location based at least on the guidance message.

In some examples, causing the autonomous vehicle to disengage autonomy can include the following actions. The autonomous vehicle can exit an autonomous drive state, and transition to a drive inactive state, and cause the drive gear of the autonomous vehicle to shift to park. In at least some examples, a remote operator may provide a time period within which such a transition must take place. For example, the autonomous vehicle may be requested to transition from an autonomous driving state to an inactive state within a given period or the like.

In some examples, the request can be a re-engage request. For instance, the autonomous vehicle may be on a mission, but the mission of the vehicle is interrupted. Then, the autonomous vehicle may disengage autonomy. The teleoperator may request the vehicle to re-engage autonomy to continue the mission. The autonomous vehicle may determine whether the re-engage request is valid, whether the autonomous vehicle meets a set of safety criteria, and whether the autonomous vehicle is free of faults that prevent autonomy. Upon determining that the re-engage request is valid, and the autonomous vehicle meets a set of safety criteria, and the autonomous vehicle is free of faults that prevent autonomy, the autonomous vehicle can re-engage autonomy. The autonomous vehicle can send a confirmation message to the remote computing system, indicating that the autonomous vehicle has re-engaged autonomy.

In some instances, after the autonomous mode is re-engaged, the teleoperator may hold the autonomous vehicle for a period of time before sending a release request to require the autonomous vehicle to continue the mission. Then, the autonomous vehicle can receive the release request from the remote computing system. Upon receiving the release request, the autonomous vehicle can conduct the mission. The purpose of holding the autonomous vehicle is to avoid unintended motion of the autonomous vehicle until a release request from the teleoperator is received. Additionally, the autonomous vehicle can send a message to the remote computing system indicating diagnostic information, such that the remote operator can understand why the autonomous vehicle is not ready to be switched to an autonomous mode.

When receiving a teleoperation request (e.g., a disengage request, an engage request, a re-engage request, or the like), the autonomous vehicle may send sensor data and component output (including subsystem output) to the remote computing system associated with the teleoperator. The sensor data may include, but is not limited to, image data, light detection and ranging (lidar) data, radar data, and/or other types of sensor data representing the environment around the autonomous vehicle. For example, the component output (including subsystem output) can include vehicle state information (e.g., position, velocity, state of charge, whether executing a mission, etc.), vehicle component/subcomponent status messages (temperature readings, voltage readings, measured output signals, statuses, etc.), or the like. In some instances, the autonomous vehicle may further send, to the remote computing system, the sensor data that indicate one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, the presence of another object in the environment, a state of another object in the environment, a time of day, a day of a week, a season, a weather condition, an indication of darkness/light, etc.

The remote computing system may receive the sensor data from the autonomous vehicle and, in response, display a user interface that includes content (e.g., image(s), video, etc.) represented by the sensor data to facilitate the teleoperator's interaction with the autonomous vehicle. Additionally, the one or more computing devices may display graphical elements indicating object(s) in the environment in which the autonomous vehicle is traversing. For example, the user interface may display a graphical element that indicates that the autonomous vehicle is moving on the road. The teleoperator may then use the user interface of the remote computing system to send guidance to the autonomous vehicle, where the instructions indicate how the autonomous vehicle is to park safely at a parking spot. Additional details regarding the communication between the teleoperator and the autonomous vehicle are described in U.S. Pat. No. 11,209,822, filed Jun. 28, 2019, and entitled "Techniques for Contacting a Teleoperator," the contents of which are incorporated herein by reference in its entirety and for all purposes.

Additionally, the techniques may provide the teleoperator with contextual information about the situation in the autonomous vehicle so that the teleoperator may provide guidance to the autonomous vehicle. A teleoperations system may include one or more teleoperators, which may be human teleoperators, located at a teleoperations center. In some examples, one or more of the teleoperators may not be human, such as, for example, they may be computer systems leveraging artificial intelligence, machine learning, and/or other decision-making strategies. In some examples, the teleoperator may interact with one or more autonomous vehicles in a fleet of autonomous vehicles via a user interface that can include a teleoperator interface. The teleoperator interface may include one or more displays configured to provide the teleoperator with data related to the operations of the autonomous vehicles. For example, the display(s) may be configured to show content related to sensor data received from the autonomous vehicles, content related to the road network, and/or additional content or information to facilitate providing assistance to the autonomous vehicles.

Additionally, or alternatively, the teleoperator interface may also include a teleoperator input device configured to allow the teleoperator to provide information to one or more of the autonomous vehicles, for example, in the form of teleoperation instructions providing guidance to the autonomous vehicles. The teleoperator input device may include one or more of a touch-sensitive screen, a stylus, a mouse, a dial, a keypad, a microphone, a touchscreen, and/or a gesture-input system configured to translate gestures performed by the teleoperator into input commands for the teleoperator interface. For instance, the teleoperations system may provide one or more of the autonomous vehicles with guidance to park safely.

teleoperator interface. For instance, the teleoperations system may provide one or more of the autonomous vehicles with guidance to park safely.

The techniques described herein can improve the autonomous vehicle in various ways. In some instances, enabling a teleoperator to engage autonomy of the autonomous vehicle can improve the efficiency of controlling one or more autonomous vehicles because a human operator does not need to come close to the autonomous vehicle to engage autonomy. In some instances, enabling a teleoperator to disengage autonomy of the autonomous vehicle can improve the safety of the autonomous vehicle when an error is detected in the autonomy system. Additionally, enabling a teleoperator to re-engage autonomy of the autonomous vehicle after an interruption of the mission can improve the efficiency of controlling the autonomous vehicle because the teleoperator can make sure that there are no faults preventing autonomy and instruct the vehicle to continue the mission remotely.

The techniques described herein can be implemented in a number of ways. Example implementations are provided below with reference to the following figures. Although discussed in the context of a vehicle, the methods, apparatuses, and systems described herein can be applied to a variety of systems.

FIG. 1 illustrates an example environment 100 that includes an autonomous vehicle 102 which can communicate with a remote computing system 104 associated with a teleoperator 106, in accordance with embodiments of the disclosure. In at least one example, the autonomous vehicle 102 may correspond to an autonomous or semi-autonomous vehicle configured to perform object perception and prediction functionality, route planning, and/or optimization. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the autonomous vehicle 102 can be configured to control all functions from start to completion of the trip, including all parking functions, it may not include a driver and/or controls for driving the autonomous vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of the vehicle, such as a van, a sport utility vehicle, a cross-over vehicle, a truck, a bus, an agricultural vehicle, and/or a construction vehicle. The autonomous vehicle 102 can be powered by one or more internal combustion engines, one or more electric motors, hydrogen power, any combination thereof, and/or any other suitable power sources. Although the example vehicle 102 has four wheels, the systems and methods described herein can be incorporated into vehicles having fewer or a greater number of wheels, tires, and/or tracks. The example vehicle 102 can have four-wheel steering and can operate generally with equal or similar performance characteristics in all directions.

The autonomous vehicle 102 may include a vehicle computing device 108. The vehicle computing device 108 can include one or more processors 110 and memory 308 communicatively coupled to the one or more processors 110. The one or more processors 110 can include, for example, one or more FPGAs. SoCs, ASICs, and/or CPUs. The memory 308 can be non-transitory computer-readable media. The memory 308 can store an operating system and one or more software applications, instructions, programs, and/or data to implement the methods described herein and the functions attributed to the various systems. In various implementations, the memory 112 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The autonomous vehicle 102 can include one or more sensors 114. For example, the sensor(s) 114 can include one or more time-of-flight sensors, lidar sensors, radar sensors, sonar sensors, image sensors, audio sensors, infrared sensors, location sensors, wheel encoders, IMUs, etc., or any combination thereof, although other types of sensors are contemplated. In some instances, the sensor(s) 114 can capture sensor data associated with the autonomous vehicle 102, such as position data (e.g., x-y-z coordinates and/or can include pitch, roll, yaw data, and the like), coordinate data, and/or orientation data associated with the autonomous vehicle 102. In some instances, the sensor(s) 114 can capture sensor data associated with other objects in the environment, including but not limited to, buildings, road surfaces, signage, barriers, trees, vehicles, pedestrians, etc. In additional and/or alternative examples, the sensor data can indicate one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, the presence of another object in the environment, a state of another object in the environment, a time of day, a day of a week, a season, a weather condition, an indication of darkness/light, etc.

The autonomous vehicle 102 may include a vehicle control system 116. The vehicle control system 116 can be configured to execute motions of the autonomous vehicle 102. In some examples, the vehicle control system 116 can be configured to receive and process engage requests, disengage requests, or re-engage requests from the remote computing system 104 associated with the teleoperator 106. The vehicle control system 116 can be configured to check conditions, and can pass or reject the engage request, the disengage request, or the re-engage request based on whether the conditions are met. For example, the conditions can include but are not limited to, whether the autonomous vehicle 102 meets a set of safety criteria, whether the engage request, disengage request, or re-engage request is valid, whether the teleoperator 106 has the authority to perform remote operations on the autonomous vehicle 102, whether the autonomous vehicle is free of faults that prevent autonomy, or the like. In some examples, the vehicle control system 116 can reject the engage request, the disengage request, or the re-engage request if the conditions are not met. On the other hand, the vehicle control system 116 can pass the engage request, the disengage request, or the re-engage request if the conditions are met. In some examples, only one teleoperator is authorized to control the autonomous vehicle 102 at a time. Thus, only requests from the authorized teleoperator will be acknowledged/validated.

In some instances, while navigating along the route 128, the autonomous vehicle 102 may determine if the autonomous vehicle 102 is moving or stationary. For example, the vehicle control system 116 may use the sensor data to determine if the velocity for the autonomous vehicle 102 is greater than zero miles per hour. If the velocity for the autonomous vehicle 102 is greater than zero miles per hour, the vehicle control system 116 can determine that the autonomous vehicle 102 is moving. If the velocity for the autonomous vehicle 102 is zero miles per hour, the vehicle control system 116 can determine that the autonomous vehicle 102 meets a set of safety criteria. Additionally, the sensor data may be updated periodically, such as every second, every 0.5 seconds, every 0.1 seconds, or the like.

The vehicle control system 116 can include a drive management component 118 configured to control the autonomous vehicle 102 to disengage autonomy or engage autonomy. For example, after the vehicle control system 116 passes the engage request, the drive management component 118 can control the autonomous vehicle 102 to engage autonomy based at least in part on the engage request. As another example, after the vehicle control system 116 passes the disengage request, the drive management component 118 can control the autonomous vehicle 102 to disengage autonomy based at least in part on the disengage request. As another example, after the vehicle control system 116 passes the re-engage request, the drive management component 118 can control the autonomous vehicle 102 to re-engage autonomy based at least in part on the re-engage request.

The vehicle control system 116 can be configured to send feedback messages to the remote computing system 104. For example, when the vehicle control system 116 rejects the engage request, the disengage request, or the re-engage request, the vehicle control system 116 can send a feedback message to the remote computing system 104 indicating a reason why the engage request, the disengage request, or the re-engage request is rejected, that the request was performed successfully, and/or any other information associated with the operation of the vehicle or its components/subcomponents. For example, the feedback message can indicate that the reason why a disengage request is rejected is that the vehicle does not meet the set of safety criteria. As another example, the feedback message can indicate that the reason why an engage request is rejected is that the engage request is not valid. As another example, the feedback message can indicate that the reason why a re-engage request is rejected is that there are faults that prevent autonomy and, if so, which one(s).

The vehicle control system 116 can be configured to send confirmation messages to the remote computing system 104 after the engagement/disengagement/re-engagement of autonomy is successfully performed for the autonomous vehicle 102. For example, after the engagement of autonomy is successfully performed for the autonomous vehicle 102, the vehicle control system 116 can send a confirmation message to the remote computing system 104, indicating that the autonomous vehicle 102 has engaged autonomy. As another example, after the disengagement of autonomy is successfully performed for the autonomous vehicle 102, the vehicle control system 116 can send a confirmation message to the remote computing system 104, indicating that the autonomous vehicle 102 has disengaged autonomy.

The autonomous vehicle 102 can communicate with the remote computing system 104 via one or more networks 120. In some examples, the network(s) can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications.

The remote computing system 104 can include one or more processors 122 and memory 124 communicatively coupled to the one or more processors 122. The one or more processors 122 and the memory 124 can be implemented in a similar manner to the processor(s) 110 and the memory 112. The remote computing system 104 may further include a user interface 126, configured to enable the teleoperator 106 to interact with the autonomous vehicle 102 from the remote computing system 104. The teleoperator 106 can use the user interface 126 to provide instructions for how the autonomous vehicle 202 is to proceed. For example, the teleoperator 106 can use the user interface 126 to instruct the autonomous vehicle 202 to safely park at a parking spot or a pick-up or drop-off location.

The user interface 126 may include one or more displays configured to provide the teleoperator 106 with data related to the operation of the autonomous vehicle 102. For example, the display(s) may be configured to show content (e.g., image(s)) related to the sensor data received from the autonomous vehicle 102. The user interface 126 may also include a teleoperator input device configured to allow the teleoperator 106 to provide information to the autonomous vehicle 102, for example, in the form of teleoperation instructions providing guidance to the autonomous vehicle 102. For example, the teleoperator 106 may send disengage/engage/re-engage requests to the autonomous vehicle 102 via the user interface 126.

To communicate with the teleoperator, the autonomous vehicle 102 may send, to the remote computing system 104 associated with the teleoperator 106, at least a portion of the sensor data (and/or any data derived therefrom). For instance, the autonomous vehicle 102 may send at least sensor data (e.g., image data) representing the autonomous vehicle 102 to the remote computing system 104. The user interface 126 may include one or more displays configured to provide the teleoperator 106 with data related to the operation of the autonomous vehicle 102. For example, the display(s) may be configured to show content (e.g., image(s)) related to the sensor data received from the autonomous vehicle 102. Additionally, the display(s) may be configured to show content (e.g., image(s)) related to the sensor data received from the autonomous vehicle 102.

The user interface 126 may also include a teleoperator input device configured to allow the teleoperator 106 to provide information to the autonomous vehicle 102, for example, in the form of teleoperation instructions providing guidance to the autonomous vehicle 102. For example, the teleoperator 106 may provide instructions for the autonomous vehicle 102 to park at a parking spot or a pick-up drop-off location.

The teleoperations system may include one or more teleoperators, which may be human teleoperators, located at a teleoperations center. In some examples, at a time, only one teleoperator can have the authority to change the engagement status of the autonomous vehicle 102, while other teleoperators can have access to the autonomous vehicle 102 to observe vehicle behaviors. In some examples, one or more of the teleoperators may not be human, such as, for example, they may be computer systems leveraging artificial intelligence, machine learning, and/or other decision-making strategies. In some examples, the teleoperator may interact with one or more autonomous vehicles in a fleet of autonomous vehicles via a user interface that can include a teleoperator interface.

For a first example, the autonomous vehicle can receive a disengage request while the autonomous vehicle is operating in autonomy on a mission. In this example, the autonomous vehicle may be in motion. Then, for operational reasons, a teleoperator may request disengage from autonomy for the autonomous vehicle. The teleoperator can perform the following actions. For example, the teleoperator can provide guidance to the autonomous vehicle 102 to a parking spot or a point out of the flow of traffic. If this is not possible for any reason, the teleoperator could trigger a signal to cause the vehicle to come to an immediate stop and hold the vehicle. In such a state, the vehicle may have an error detected and the vehicle will come to a stop. After the vehicle is safely parked at a parking spot or a point, the teleoperator can send a disengage request to the autonomous vehicle. For the disengage request received while the autonomous vehicle 102 is in autonomy and on a mission, the vehicle control system 116 can be configured to check whether the disengage request is valid, and whether the autonomous vehicle 102 meets a set of safety criteria. If any of the conditions are not met (e.g., the disengage request is not valid, or the autonomous vehicle 102 does not meet the set of safety criteria), the vehicle control system 116 can reject the disengage request. The vehicle control system 116 can provide feedback to the teleoperator on why the disengage request was rejected. If all of these conditions are met (e.g., the disengage request is valid, and the autonomous vehicle 102 meets the set of safety criteria), the vehicle control system 116 can pass the disengage request. The vehicle control system 116 can cause the autonomous vehicle 102 to exit the autonomous drive state and transition to a drive inactive state where manually input controls (whether local to the vehicle or remote therefrom) may be issued to control the vehicle such as, for example, electronic parking brakes (EPBs), shifting drive gear, applying an acceleration/deceleration, changing a steering angle, etc. Next, the vehicle control system 116 can also send confirmation to the teleoperator, indicating that a successful disengagement has occurred.

For a second example, the autonomous vehicle can receive a disengage request while the autonomous vehicle is operating in autonomy but not on a mission. The autonomous vehicle is likely not in a designated location or parking spot. In some examples, it may be necessary for the autonomous vehicle 302 to disengage autonomy to comply with the law. For operational reasons, the teleoperator can request the autonomous vehicle to disengage from autonomy and send a disengage request. The vehicle control system 16 can receive the disengage request. For the disengage request received while the autonomous vehicle 102 is in autonomy but not on a mission, the vehicle control system 116 can be configured to check whether the disengage request is valid, and whether the autonomous vehicle 102 meets a set of safety criteria. If any of these conditions are not met (e.g., the disengage request is not valid, or the autonomous vehicle 102 does not meet the set of safety criteria), the vehicle control system 116 can reject the disengage request. The vehicle control system 116 can send feedback to the teleoperator, indicating why the disengage request is rejected. If all of these conditions are met (e.g., the disengage request is valid, and the autonomous vehicle 102 meets a set of safety criteria), the vehicle control system 116 can pass the disengage request and perform disengagement. The vehicle control system 116 can send confirmation to the teleoperator, indicating that the autonomous vehicle has disengaged autonomy successfully.

For a third example, the autonomous vehicle 102 can receive an engage request from the teleoperator while the autonomous vehicle 102 is not in autonomy and not on a mission. In this example, a mission can be sent to the vehicle and the teleoperator can request the autonomous vehicle to engage autonomy to start the mission. The vehicle control system 116 can receive the mission and the engage request from the remote computing system 104. The vehicle control system 116 can be configured to check whether the autonomous vehicle 102 meets a set of safety criteria, whether the autonomous vehicle 102 is free of faults that prevent autonomy, and whether the engage request is valid. In some examples, the autonomous vehicle may run a cyclic redundancy check (CRC) on the data included in the engage request to determine whether the engage request is valid. CRC can be used to validate the data in the engage request to make sure that the data in the engage request is not corrupted during transmission. If any of the conditions are not met (e.g., the autonomous vehicle 102 does not meet the set of safety criteria, or there are faults that prevent autonomy, or the engage request is not valid), the vehicle control system 116 can reject the engage request. Examples of faults that prevent engagement of autonomy can include, but are not limited to, a planner of the autonomous vehicle being unfunctional, an electronic drive of the autonomous vehicle being not available, a braking system of the autonomous vehicle being unfunctional, or the like. The vehicle control system 116 can send feedback to the teleoperator, indicating why the engage request is rejected. If all of these conditions are met (e.g., the autonomous vehicle 102 meets the set of safety criteria, and there are not faults that prevent autonomy, and the engage request is not valid), the vehicle control system 116 can pass the engage request, and perform engagement of autonomy. The vehicle control system 116 can send confirmation to the teleoperator, indicating that the autonomous vehicle 102 has engaged autonomy successfully. After the engagement, the autonomous vehicle 102 can remain stationary and wait for a release request from the teleoperator. The teleoperator can make sure that the vehicle is ready to start the mission and send the release request to the autonomous vehicle 102. The vehicle control system 116 can receive the release request and cause the autonomous vehicle 102 to start the mission.

As a fourth example, the autonomous vehicle 102 may be on mission but has a fault that triggered a disengagement of autonomy. Examples of faults that can trigger the disengagement can include, but are not limited to, sensor malfunctioning, data unreliability, loss of connection or bandwidth issues, environmental conditions, or the like. In this example, the autonomous vehicle 102 already has access to the current mission. For operational reasons, the teleoperator can request the autonomous vehicle 102 to re-engage autonomy. The teleoperator can perform various actions. For example, the teleoperator can confirm that the mission for the autonomous vehicle 102 is correct, and that the planner's path is correct. The teleoperator can also confirm the disengagement reason for the autonomous vehicle 102, and can attempt to clear/resolve the faults before attempting to re-engage autonomy. The vehicle control system 116 can receive the re-engage request from the remote computing system 104. The vehicle control system 116 can be configured to check whether the autonomous vehicle 102 meets a set of safety criteria, whether the autonomous vehicle 102 is free of faults that prevent autonomy, and whether the re-engage request is valid. If any of these conditions are not met (e.g., the autonomous vehicle 102 does not meet the set of safety criteria, or there are faults that prevent autonomy, or the re-engage request is not valid), the vehicle control system 116 can reject the re-engage request. The vehicle control system 116 can send feedback to the teleoperator, indicating why the re-engage request is rejected. If all of these conditions are met (e.g., the autonomous vehicle 102 meets the set of safety criteria, and there are not faults that prevent autonomy, and the re-engage request is not valid), the vehicle control system 116 can pass the re-engage request, and perform re-engagement of autonomy. The vehicle control system 116 can send confirmation to the teleoperator, indicating that the autonomous vehicle 102 has re-engaged autonomy successfully. After the re-engagement, the autonomous vehicle 102 can remain stationary and wait for a release request from the teleoperator. The teleoperator can make sure that the vehicle is ready to start the mission and send the release request to the autonomous vehicle 102. The vehicle control system 116 can receive the release request and cause the autonomous vehicle 102 to start/ continue the mission.

Figure 2A:
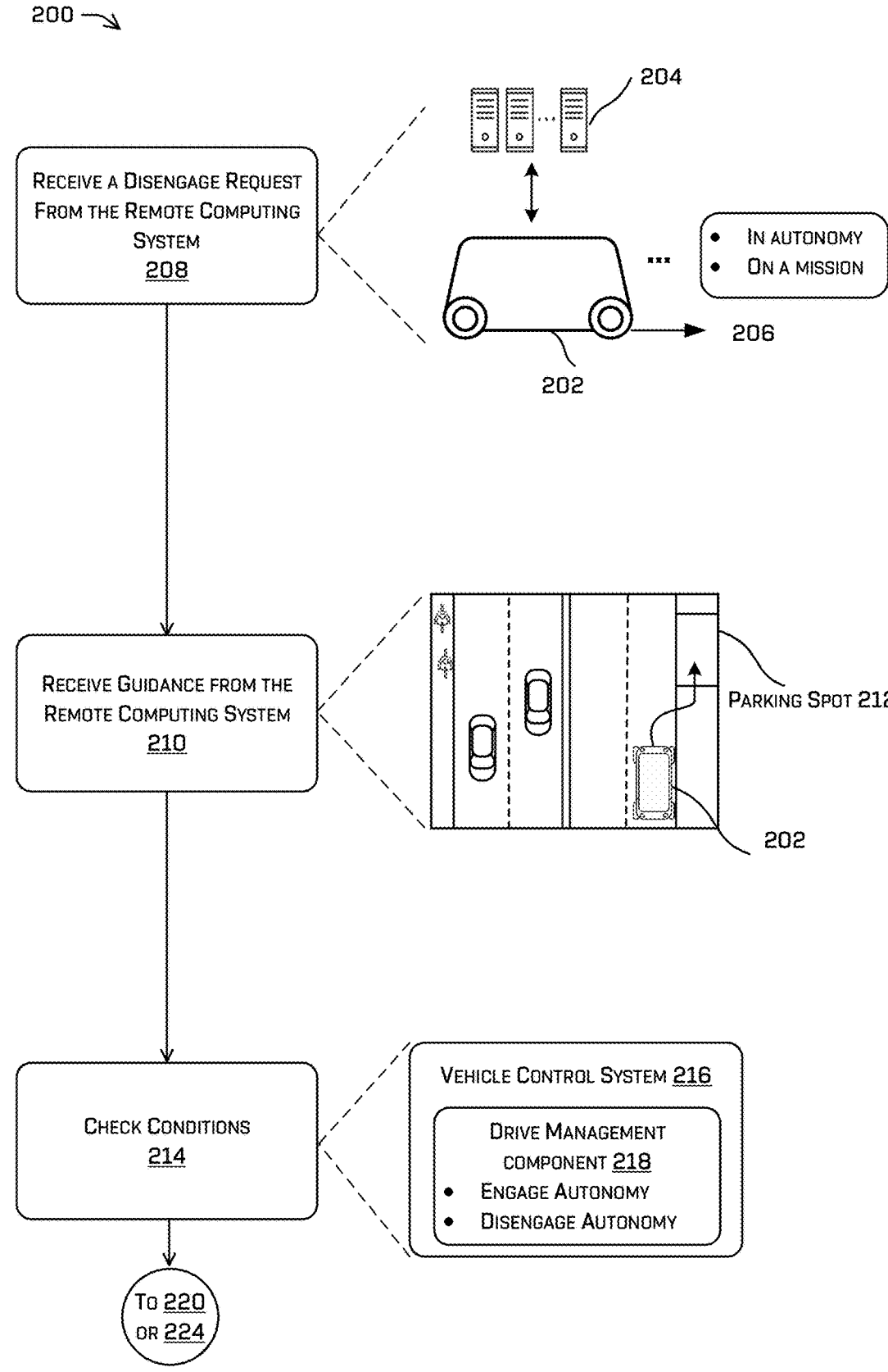
FIG. 2A and FIG. 2B illustrate an example scenario in which an autonomous vehicle receives a disengage request from a remote computing system while the autonomous vehicle is in autonomy and on a mission, in accordance with embodiments of the disclosure.
Figure 2B:
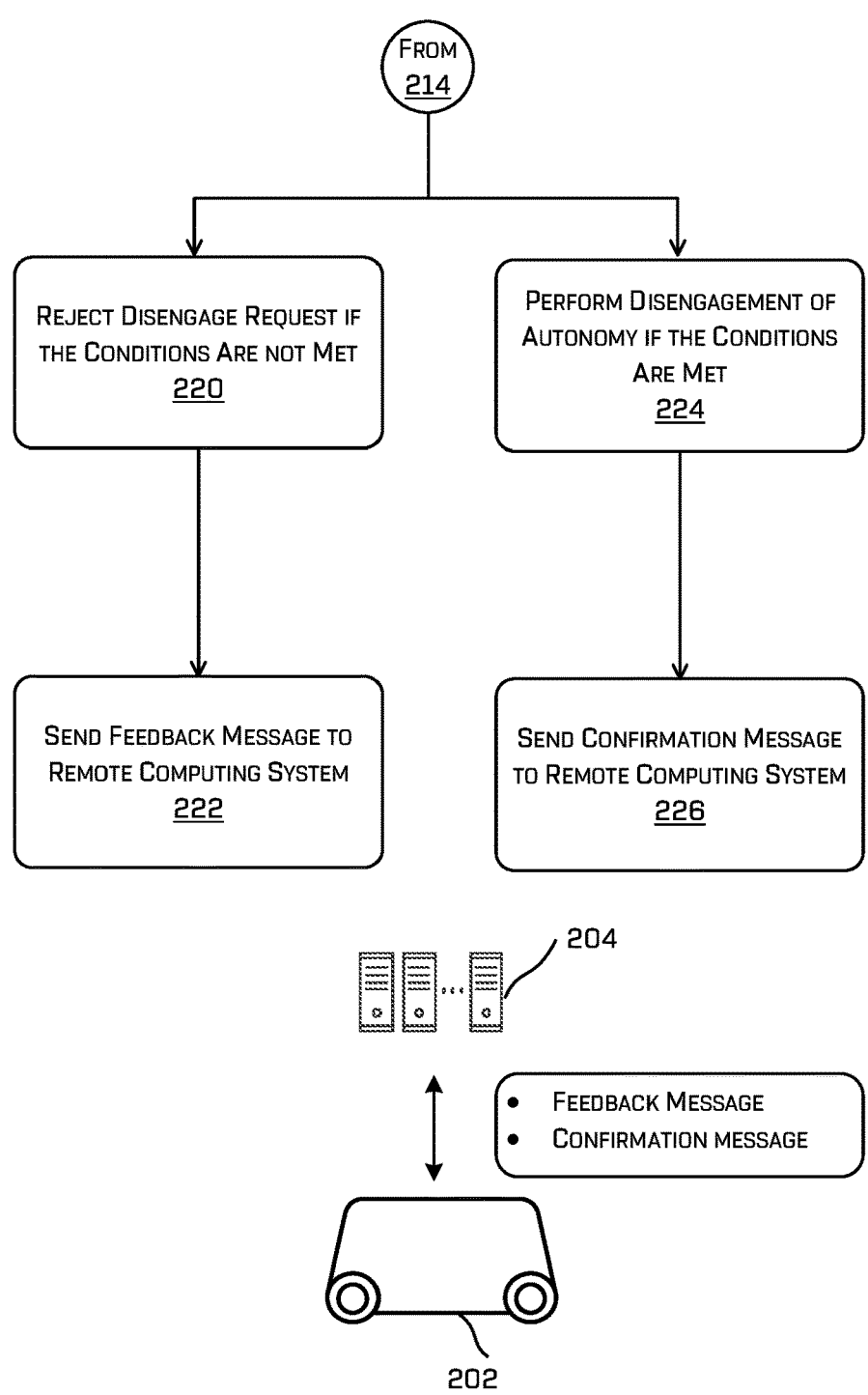

FIG. 2A and FIG. 2B illustrate an example scenario 200 in which an autonomous vehicle 202 receives a disengage request from a remote computing system 204 (e.g., a teleoperator) while the autonomous vehicle 202 is in autonomy and on a mission, in accordance with embodiments of the disclosure. For instance, the autonomous vehicle 202 may be operating along a route 206 in an environment. The autonomous vehicle 202 can correspond to the autonomous vehicle 102 in FIG. 1.

At 208, the autonomous vehicle 202 may receive a disengage request from the remote computing system 204. In some instances, for some operational reasons, a teleoperator may request the autonomous vehicle 202 to disengage from autonomy.

At 210, the autonomous vehicle 202 may receive guidance from the remote computing system 210. In some instances, to ensure that disengagement of autonomy for the autonomous vehicle 202 occurs only when the autonomous vehicle 202 meets a set of safety criteria, the teleoperator can provide guidance to the autonomous vehicle 202 to stop safely before executing the disengage request. For example, the teleoperator can provide guidance to the autonomous vehicle 202 to park at a parking spot 212 or a pick-up or drop-off location out of the flow of traffic in the environment. In some instances, if it is not possible for the teleoperator to guide the autonomous vehicle to park, the teleoperator may trigger a relatively immediate stop of the autonomous vehicle 202 and hold the autonomous vehicle 202 in the stopped state.

At 214, the autonomous vehicle 202 may check one or more conditions. For example, an vehicle control system 216 of the autonomous vehicle 202 can determine whether the autonomous vehicle 202 meets a set of safety criteria, and whether the disengage request is valid. In some examples, the autonomous vehicle may run a cyclic redundancy check (CRC) on the data included in the disengage request to determine whether the disengage request is valid. CRC can be used to validate the data in the disengage request to make sure that the data in the disengage request is not corrupted during transmission. Note that such conditions are examples rather than limitations, and there can be other conditions to be checked. In some examples, the autonomous vehicle may run a CRC on the data included in the disengage request to determine whether the disengage request is valid. CRC can be used to validate the data in the disengage request to make sure that the data in the disengage request is not corrupted during transmission. In some examples, the vehicle control system 216 of the autonomous vehicle 202 can include a drive management component 218. The drive management component 218 can be configured to cause the autonomous vehicle to engage autonomy or disengage autonomy.

In some examples, the disengage request can be determined to be valid if the source of the disengage request is the right source, and the data included in the disengage request is not corrupted, or the like. For example, the autonomous vehicle may determine whether the remote computing system that sends the engage request is an authentic teleoperator computing system. In some examples, the identifications (IDs) of the authentic teleoperator computing system can be stored in the autonomous vehicle. The autonomous vehicle may determine whether data included in the engage request is corrupted by running CRC on the data of the engage request. Upon determining that the remote computing system that sends the engage request is the authentic remote computing system, and the data included in the engage request is not corrupted, determining that the engage request is valid.

Referring to FIG. 2B, at 220, the autonomous vehicle 202 may reject the disengage request if the conditions are not met. If any of the conditions are not met (e.g., the disengage request is not valid, or the autonomous vehicle 202 does not meet a set of safety criteria), the vehicle control system 116 of the autonomous vehicle 202 can reject the disengage request.

At 222, the autonomous vehicle 202 may send a feedback message to the remote computing system 204. In some examples, the feedback message may indicate the reason why the disengage request is rejected. For example, the feedback message may indicate that the reason for the disengage request to be rejected is that the disengage request is not valid. As another example, the feedback message may indicate that the reason for the disengage request to be rejected is that the autonomous vehicle 202 does not meet the set of safety criteria. In at least some examples, such feedback may further comprise sensor information, vehicle state information (e.g., position, velocity, state of charge, whether executing a mission, etc.), vehicle component/subcomponent status messages (temperature readings, voltage readings, measured output signals, statuses, etc.), or the like.

At 224, the autonomous vehicle 202 may pass the disengage request and perform disengagement of autonomy if the conditions are met. If all of the conditions are met (e.g., the disengage request is valid, and the autonomous vehicle 202 meets the set of safety criteria), the vehicle control system 216 of the autonomous vehicle 202 can perform disengagement of autonomy based at least in part on the disengage request. For example, the drive management component 218 of the vehicle control system 216 can cause the autonomous vehicle 202 to disengage autonomy, i.e., to exit the autonomous drive state and transition to a drive inactive state, where electronic parking brakes (EPBs) can be applied and the drive gear of the autonomous vehicle 202 shifts to park.

At 226, the autonomous vehicle 202 may send a confirmation message to the remote computing system 204. After performing the disengagement, the vehicle control system 216 of the autonomous vehicle 202 can send a confirmation message to the remote computing system 204, indicating that the autonomous vehicle 202 has disengaged autonomy.

Figure 3:
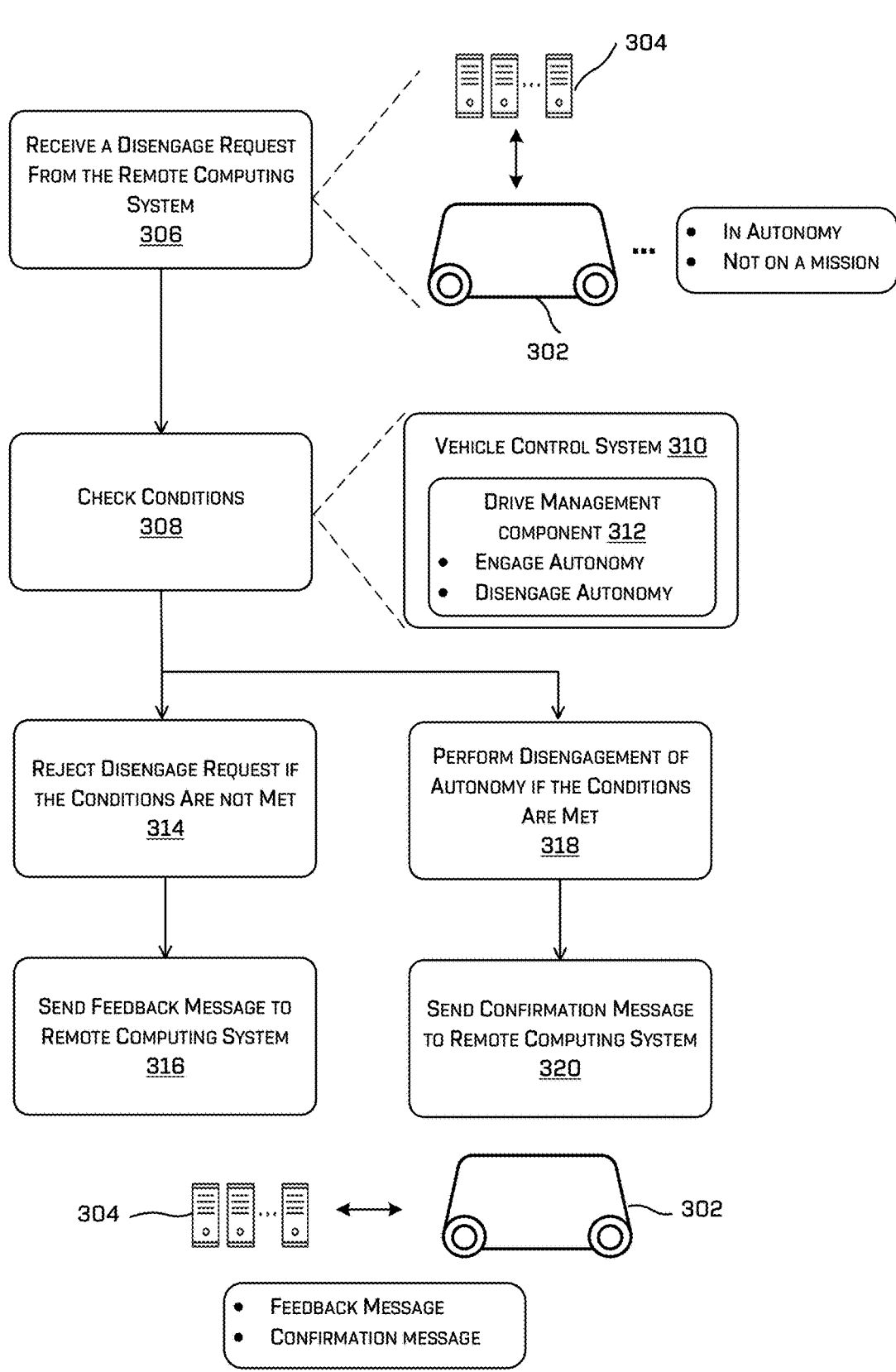
FIG. 3 illustrates an example scenario in which an autonomous vehicle receives a disengage request from a remote computing system while the autonomous vehicle is in autonomy but not on a mission, in accordance with embodiments of the disclosure.

FIG. 3 illustrates an example scenario 300 in which an autonomous vehicle 302 receives a disengage request from a remote computing system 304 while the autonomous vehicle 302 is in autonomy but not on a mission, in accordance with embodiments of the disclosure. The autonomous vehicle 302 can correspond to the autonomous vehicle 102 in FIG. 1.

At 306, the autonomous vehicle 302 may receive a disengage request from the remote computing system 304. The disengage request may require the autonomous vehicle 302 to disengage autonomy. In some instances, for some operational reasons, a teleoperator may request the autonomous vehicle 302 to disengage from autonomy. In some examples, the autonomous vehicle 302 may not be in a designated location or parking spot. In some examples, it may be necessary for the autonomous vehicle 302 to disengage autonomy to comply with the law.

At 308, the autonomous vehicle 302 may check one or more conditions. For example, an vehicle control system 310 of the autonomous vehicle 302 can determine whether the autonomous vehicle 302 meets a set of safety criteria, and whether the disengage request is valid. In some examples, the autonomous vehicle may run a CRC on the data included in the disengage request to determine whether the disengage request is valid. CRC can be used to validate the data in the disengage request to make sure that the data in the disengage request is not corrupted during transmission. In some examples, the vehicle control system 310 of the autonomous vehicle 302 can include a drive management component 312. Note that such conditions are examples rather than limitations, and there can be other conditions to be checked. The drive management component 312 can be configured to cause the autonomous vehicle to engage autonomy or disengage autonomy.

At 314, the autonomous vehicle 302 may reject the disengage request if the conditions are not met. If any of the conditions are not met (e.g., the disengage request is not valid, or the autonomous vehicle 302 does not meet a set of safety criteria), the vehicle control system 116 of the autonomous vehicle 302 can reject the disengage request.

At 316, the autonomous vehicle 302 may send a feedback message to the remote computing system 304. In some examples, the feedback message may indicate the reason why the disengage request is rejected. For example, the feedback message may indicate that the reason for the disengage request to be rejected is that the disengage request is not valid. As another example, the feedback message may indicate that the reason for the disengage request to be rejected is that the autonomous vehicle 302 does not meet a set of safety criteria. In at least some examples, such feedback may further comprise sensor information, vehicle state information (e.g., position, velocity, state of charge, whether executing a mission, etc.), vehicle component/subcomponent status messages (temperature readings, voltage readings, measured output signals, statuses, etc.), or the like.

At 318, the autonomous vehicle 302 may pass the disengage request and perform disengagement of autonomy if the conditions are met. If all of the conditions are met (e.g., the disengage request is valid, and the autonomous vehicle 302 meets a set of safety criteria), the vehicle control system 316 of the autonomous vehicle 302 can perform disengagement of autonomy based at least in part of the disengage request. For example, the drive management component 318 of the vehicle control system 316 can cause the autonomous vehicle 302 to disengage autonomy, i.e., to exit the autonomous drive state and transition to a drive inactive state, where electronic parking brakes (EPBs) can be applied and the drive gear of the autonomous vehicle 302 shifts to park.

At 320, the autonomous vehicle 302 may send a confirmation message to the remote computing system 304. After performing the disengagement, the vehicle control system 316 of the autonomous vehicle 302 can send a confirmation message to the remote computing system 304, indicating that the autonomous vehicle 302 has disengaged autonomy.

Figure 4A:
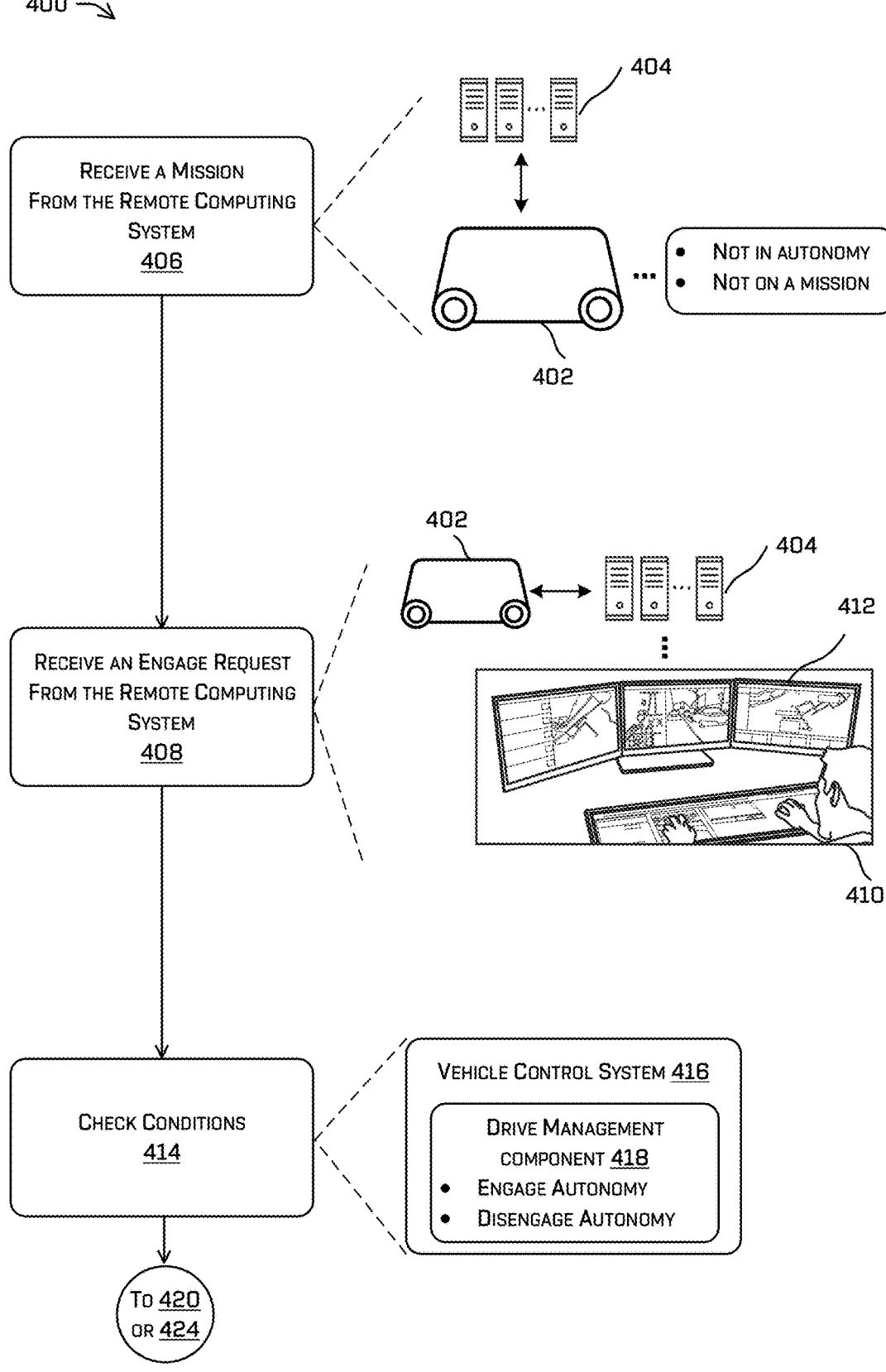
FIG. 4A, FIG. 4B, and FIG. 4C illustrate an example scenario in which an autonomous vehicle receives an engage request from a remote computing system while the autonomous vehicle is not in autonomy and not on a mission, in accordance with embodiments of the disclosure.
Figure 4B:
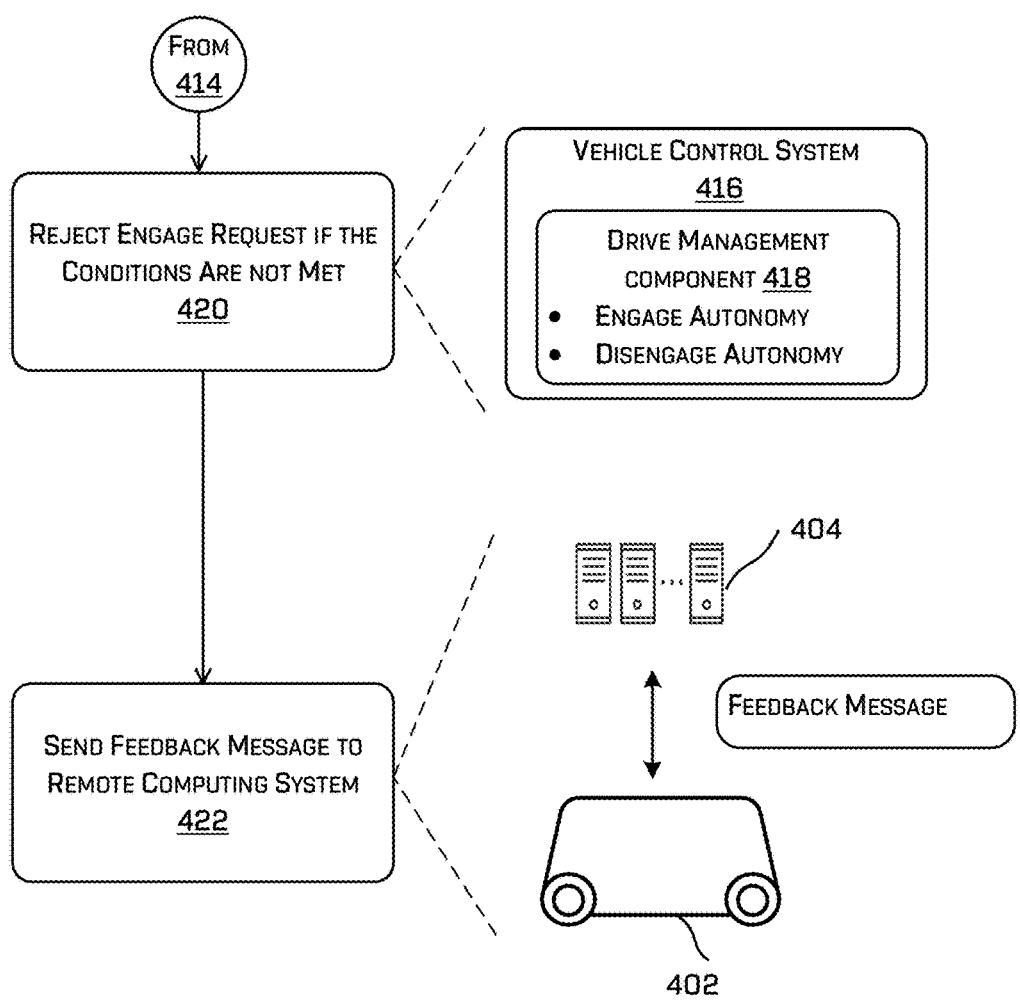
Figure 4C:
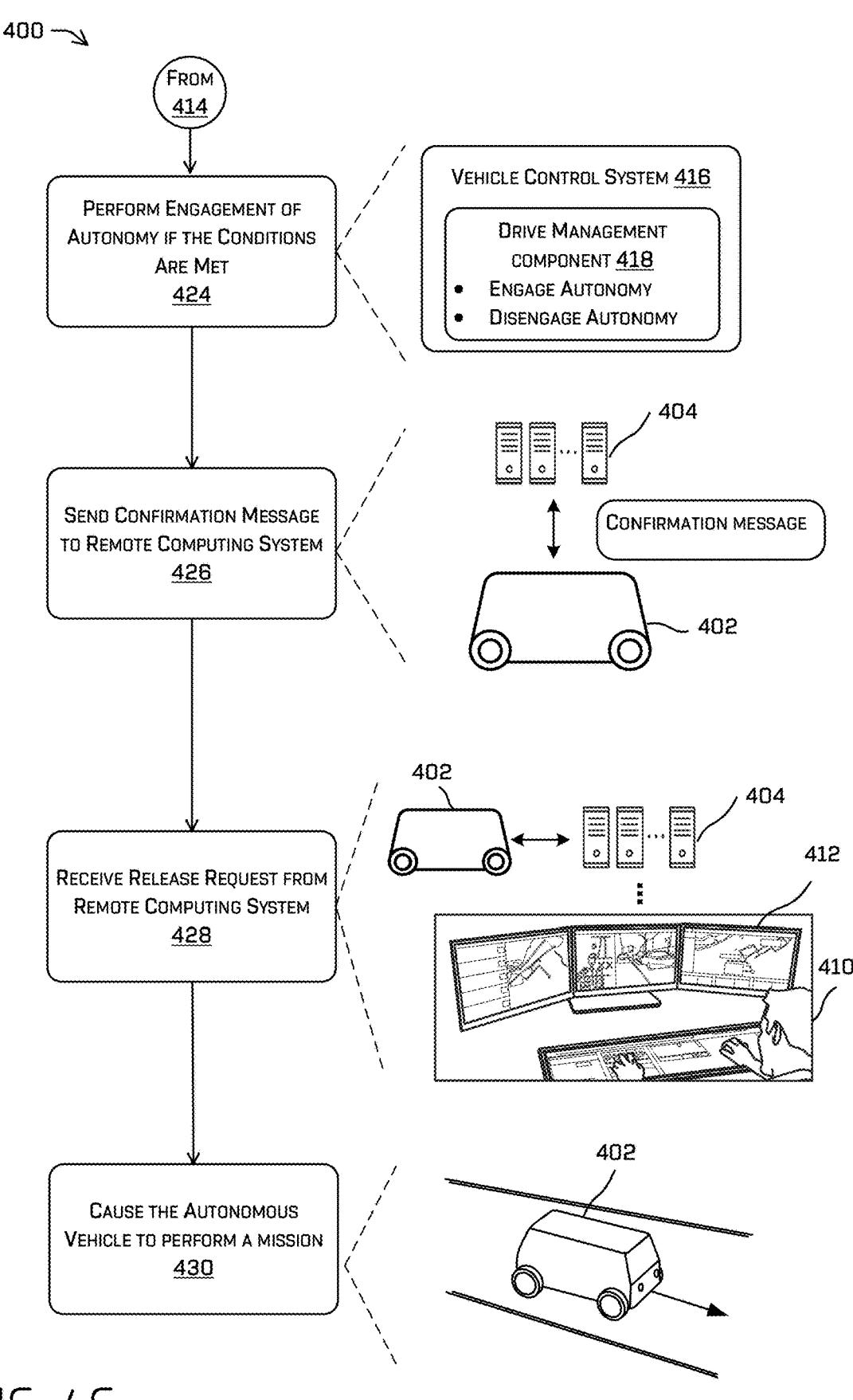

FIG. 4A, FIG. 4B, and FIG. 4C illustrate an example scenario 400 in which an autonomous vehicle 402 receives an engage request from a remote computing system 404 while the autonomous vehicle 402 is not in autonomy and not on a mission, in accordance with embodiments of the disclosure. For instance, the autonomous vehicle 402 may be stationary in an environment. The autonomous vehicle 402 can correspond to the autonomous vehicle 102 in FIG. 1.

At 406, the autonomous vehicle 402 may receive a mission from the remote computing system 404. For example, the autonomous vehicle 402 may receive a mission from the remote computing system 404 to pick up a passenger at a pickup location and provide transport to a destination location, and navigate from the pickup location to the destination location.

At 408, the autonomous vehicle 402 may receive an engage request from the remote computing system 404. The engage request may require the autonomous vehicle 402 to engage autonomy. On the end of the remote computing system 404, before sending the engage request, the teleoperator 410 can perform various actions. As described herein, the remote computing system 404 can include one or more displays 412 configured to provide the teleoperator 410 with data related to operations of the autonomous vehicle 402. For example, the displays 412 may be configured to show content related to sensor data received from the autonomous vehicle 402, content related to the road network, and/or additional content or information to facilitate providing assistance to the autonomous vehicle 402. In this example, the teleoperator 410 can confirm that the mission for the autonomous vehicle 402 is correct.

In some instances, the autonomous vehicle 402 can include a planner that can determine a path for the vehicle 602 to follow to traverse through an environment. For example, the planner can determine various routes and trajectories and various levels of detail. For example, the planner can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planner can generate an instruction for guiding the vehicle 402 along at least a portion of the route from the first location to the second location. In at least one example, the planner can determine how to guide the vehicle 402 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 402 to navigate.

At 414, the autonomous vehicle 402 may check one or more conditions. For example, an vehicle control system 416 of the autonomous vehicle 402 can determine whether the autonomous vehicle 402 meets a set of safety criteria, whether the autonomous vehicle 402 is free of faults that prevent autonomy, and/or whether the engage request is valid. In some examples, the autonomous vehicle may run a CRC on the data included in the engage request to determine whether the engage request is valid. CRC can be used to validate the data in the engage request to make sure that the data in the engage request is not corrupted during transmission. Note that such conditions are examples rather than limitations, and there can be other conditions to be checked. For example, the autonomous vehicle 402 can check other conditions such as the vehicle system status, the battery status, weather conditions, environmental conditions, or the like. In some examples, the vehicle control system 416 of the autonomous vehicle 402 can include a drive management component 418. The drive management component 418 can be configured to cause the autonomous vehicle 402 to engage autonomy or disengage autonomy.

Referring to FIG. 4B, at 420, the autonomous vehicle 402 may reject the engage request if the conditions are not met. If any of the conditions are not met (e.g., the autonomous vehicle 402 does not meet a set of safety criteria, or the autonomous vehicle 402 is not free of faults that prevent autonomy, or the engage request is not valid), the vehicle control system 116 of the autonomous vehicle 402 can reject the disengage request.

At 422, the autonomous vehicle 402 may send a feedback message to the remote computing system 404. In some examples, the feedback message may indicate the reason why the engage request is rejected. For example, the feedback message may indicate that the reason for the engage request to be rejected is that the engage request. As another example, the feedback message may indicate that the reason for the engage request to be rejected is that the autonomous vehicle 402 does not meet the set of safety criteria. As another example, the feedback message may indicate that the reason for the engage request to be rejected is that the autonomous vehicle 402 is not free of faults that prevent autonomy. In at least some examples, such feedback may further comprise sensor information, vehicle state information (e.g., position, velocity, state of charge, whether executing a mission, etc.), vehicle component/subcomponent status messages (temperature readings, voltage readings, measured output signals, statuses, etc.), or the like.

Referring to FIG. 4C, at 424, the autonomous vehicle 402 may pass the engage request and perform engagement of autonomy if the conditions are met. If all of the conditions are met (e.g., the autonomous vehicle 402 meets the set of safety criteria, and the autonomous vehicle 402 is free of faults that prevent autonomy, and the engage request is valid), the vehicle control system 416 of the autonomous vehicle 402 can perform engagement of autonomy based at least in part on the engage request. For example, the drive management component 418 of the vehicle control system 416 can cause the autonomous vehicle 402 to engage autonomy, i.e., to exit the drive inactive state and transition to an autonomous drive state.

In some examples, if the conditions are satisfied, the drive management component 418 of the vehicle control system 416 can transition from an inactive driving state to an engage drive state first, and then transition from engage drive state to an autonomous control drive state At 426, the autonomous vehicle 402 may send a confirmation message to the remote computing system 404. For instance, after performing the engagement, the vehicle control system 416 of the autonomous vehicle 402 can send a confirmation message to the remote computing system 404, indicating that the autonomous vehicle 202 has engaged autonomy and/or comprising information about any one or more components, subcomponents, systems, sensors, etc. of the vehicle.

At 428, the autonomous vehicle 402 may receive a release request from the remote computing system 404. The release request may require the autonomous vehicle 402 to start the mission. In this example, the vehicle control system 416 of the autonomous vehicle 402 can cause the autonomous vehicle 402 to engage autonomy and remain stationary until receiving the release request sent by the teleoperator 410. As such, the autonomous vehicle 402 would not be in motion before receiving the release request sent by the teleoperator 410. As such, the safety of the autonomous vehicle can be improved.

As described above, the remote computing system 404 can include one or more displays 412 configured to provide the teleoperator 410 with data related to the operations of the autonomous vehicle 402. For example, the displays 412 may be configured to show content related to sensor data received from the autonomous vehicle 402, content related to the road network, and/or additional content or information to facilitate providing assistance to the autonomous vehicle 402. At the end of the remote computing system 404, the teleoperator 410 may make a decision that it is safe for the autonomous vehicle 402 to start the mission and send the release request to the autonomous vehicle 402.

At 430, the autonomous vehicle 402 may perform the mission upon receiving the release request. For example, an vehicle control system 416 of the autonomous vehicle 402 can cause the autonomous vehicle 402 to perform the mission. For example, the autonomous vehicle 402 may start the mission to pick up a passenger at a pickup location and provide transport to a destination location, and navigate from the pickup location to the destination location.

Figure 5A:
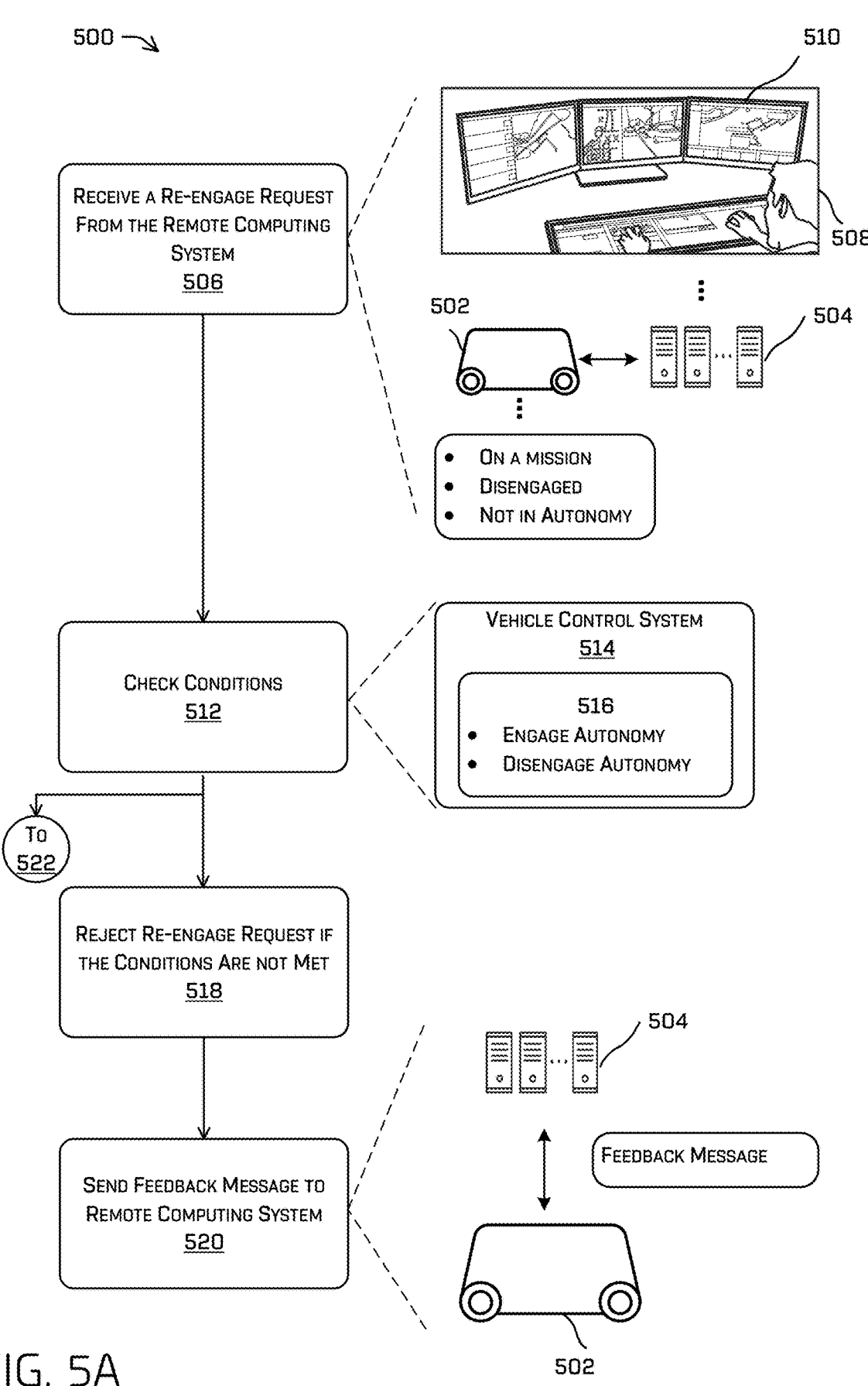
FIG. 5A and FIG. 5B illustrate an example scenario in which an autonomous vehicle receives a re-engage request from a remote computing system while the autonomous vehicle is on a mission but disengaged and not in autonomy, in accordance with embodiments of the disclosure.
Figure 5B:
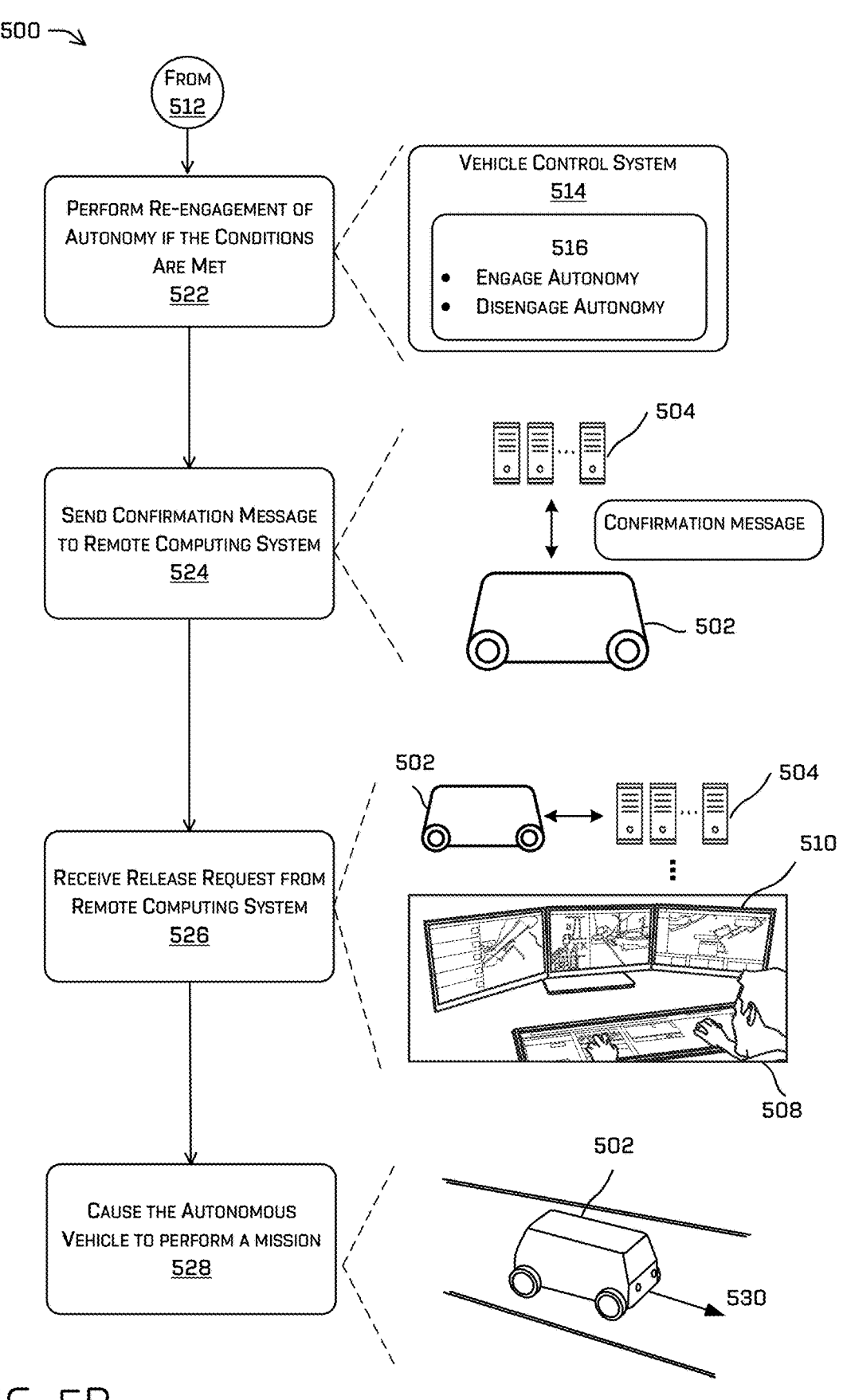

FIG. 5A and FIG. 5B illustrate an example scenario 500 in which an autonomous vehicle 502 receives a re-engage request from a remote computing system 504 while the autonomous vehicle 502 is on a mission but disengaged and not in autonomy, in accordance with embodiments of the disclosure. For instance, the autonomous vehicle 502 may be stationary in an environment. The autonomous vehicle 502 can correspond to the autonomous vehicle 102 in FIG. 1.

At 506, the autonomous vehicle 502 may receive a re-engage request from the remote computing system 504. For example, the autonomous vehicle 502 has a fault that triggered a disengagement during a mission, and thus the autonomous vehicle 502 is not in autonomy. Because the autonomous vehicle 502 is on the mission, a planner of the autonomous vehicle 502 already has access to the current mission. In some instances, because the autonomous vehicle 502 is disengaged during the mission, the autonomous vehicle 502 may stop in-lane, blocking traffic. Therefore, it may be necessary to resolve the fault and cause the autonomous vehicle 502 to re-engage autonomy.

Before sending the re-engage request, the teleoperator 508 may perform various actions. As described herein, the remote computing system 504 can include one or more displays 510 configured to provide the teleoperator 508 with data related to the operations of the autonomous vehicle 502. For example, the displays 510 may be configured to show content related to sensor data received from the autonomous vehicle 502, content related to the road network, and/or additional content or information to facilitate providing assistance to the autonomous vehicle 502. For example, the teleoperator 508 can confirm that the mission for the autonomous vehicle 502 is correct, and that the planner's path is correct. Additionally, because the autonomous vehicle 502 has a fault that triggered a disengagement during the mission, the teleoperator 508 can confirm the disengagement reason, and can attempt to clear/resolve the faults before attempting to re-engage autonomy. Additionally, the teleoperator can recheck for reasons that would prevent autonomy because from the time of disengagement something new could have occurred that would prevent engagement. For example, the weather condition (e.g., snowy weather, stormy weather, or the like) may be not suitable for the autonomous vehicle 502 to re-engage autonomy. As another example, some components or subsystems of the autonomous vehicle may not work properly (e.g., a planner of the autonomous vehicle being unfunctional, an electronic drive of the autonomous vehicle being not available, a braking system of the autonomous vehicle being unfunctional, or the like), such that it is not safe for the autonomous vehicle 502 to re-engage autonomy.

At 512, the autonomous vehicle 502 may check one or more conditions. For example, an vehicle control system 514 of the autonomous vehicle 502 can determine whether the autonomous vehicle 502 meets a set of safety criteria, whether the autonomous vehicle 502 is free of faults that prevent autonomy, and whether the re-engage request is valid. In some examples, the autonomous vehicle may run a CSC on the data included in the re-engage request to determine whether the re-engage request is valid. CSC can be used to validate the data in the re-engage request to make sure that the data in the re-engage request is not corrupted during transmission. Note that such conditions are examples rather than limitations, and there can be other conditions to be checked. In some examples, the vehicle control system 514 of the autonomous vehicle 502 can include a drive management component 516. The drive management component 516 can be configured to cause the autonomous vehicle 502 to engage autonomy or disengage autonomy.

In some examples, the autonomous vehicle can receive, from the remote computing system, instructions for solving the faults, and perform operations to resolve the faults. The teleoperator can determine how to solve the faults and send instructions to the autonomous vehicle. For example, when the planner of the autonomous vehicle is unfunctional, the teleoperator can send instructions to the autonomous vehicle to restart the planner. The autonomous vehicle can follow the instructions from the teleoperator and solve the faults. After the faults are resolved, the autonomous vehicle can send a feedback message to the remote computing system, the feedback message indicating that the faults are resolved.

At 518, the autonomous vehicle 502 may reject the re-engage request if the conditions are not met. If any of the conditions are not met (e.g., the autonomous vehicle 502 does not meet a set of safety criteria, or the autonomous vehicle 502 is not free of faults that prevent autonomy, or the re-engage request is not valid), the vehicle control system 116 of the autonomous vehicle 502 can reject the re-engage request.

At 520, the autonomous vehicle 502 may send a feedback message to the remote computing system 504. In some examples, the feedback message may indicate the reason why the re-engage request is rejected. For example, the feedback message may indicate that the reason for the re-engage request to be rejected is that the re-engage request is not valid. As another example, the feedback message may indicate that the reason for the re-engage request to be rejected is that the autonomous vehicle 502 does not meet the set of safety criteria. As another example, the feedback message may indicate that the reason for the re-engage request to be rejected is that the autonomous vehicle 502 is not free of faults that prevent autonomy. In any example, such a feedback message may further comprise vehicle information including, but not limited to, a state, component status, mission status, passenger information (e.g., destination, time stuck, health issues, etc.), etc.

Referring to FIG. 5B, at 522, the autonomous vehicle 502 may pass the re-engage request and perform re-engagement of autonomy if the conditions are met. If all of the conditions are met (e.g., the autonomous vehicle 502 meets the set of safety criteria, and the autonomous vehicle 502 is free of faults that prevent autonomy and the re-engage request is valid), the vehicle control system 514 of the autonomous vehicle 502 can perform re-engagement of autonomy based at least in part of the re-engage request. For example, the drive management component 516 of the vehicle control system 514 can cause the autonomous vehicle 502 to engage autonomy, i.e., to exit the drive inactive state and transition to an autonomous drive state. In some examples, if the conditions are satisfied, the drive management component 516 of the vehicle control system 514 can transition from an inactive driving state to an engage drive state first, and then transition from engage the drive state to an autonomous control drive state. In some examples, transitions from the inactive drive state to the engage state and then to autonomous control could take multiple seconds, for example, 10 seconds, or the like.

At 524, the autonomous vehicle 502 may send a confirmation message to the remote computing system 504. After performing the re-engagement, the vehicle control system 514 of the autonomous vehicle 502 can send a confirmation message to the remote computing system 504, indicating that the autonomous vehicle 202 has re-engaged autonomy.

At 526, the autonomous vehicle 502 may receive a release request from the remote computing system 504. The release request may require the autonomous vehicle 502 to start the mission. In this example, the vehicle control system 514 of the autonomous vehicle 502 can cause the autonomous vehicle 502 to re-engage autonomy and remain stationary until receiving the release request sent by the teleoperator 508. Hence, the vehicle control system 514 can prevent unintended acceleration by 'holding' the vehicle and waiting for a release request from the teleoperator after processing an engagement request. As such, the autonomous vehicle 502 would not be in motion before receiving the release request sent by the teleoperator 508, improving the safety of the operation of the autonomous vehicle.

As described above, the remote computing system 504 can include one or more displays 510 configured to provide the teleoperator 508 with data related to the operations of the autonomous vehicle 502. For example, the displays 510 may be configured to show content related to sensor data received from the autonomous vehicle 502, content related to the road network, and/or additional content or information to facilitate providing assistance to the autonomous vehicle 502. At the end of the remote computing system 504, the teleoperator 508 may make a decision that it is safe for the autonomous vehicle 502 to start the mission and send the release request to the autonomous vehicle 502.

At 528, the autonomous vehicle 502 may perform the mission upon receiving the release request. For example, an vehicle control system 514 of the autonomous vehicle 502 can cause the autonomous vehicle 502 to continue performing the mission that has been interrupted by a disengagement after receiving the release request. For example, the autonomous vehicle 502 may continue a mission from one location to another location, and navigate along a route 530.

Figure 6:
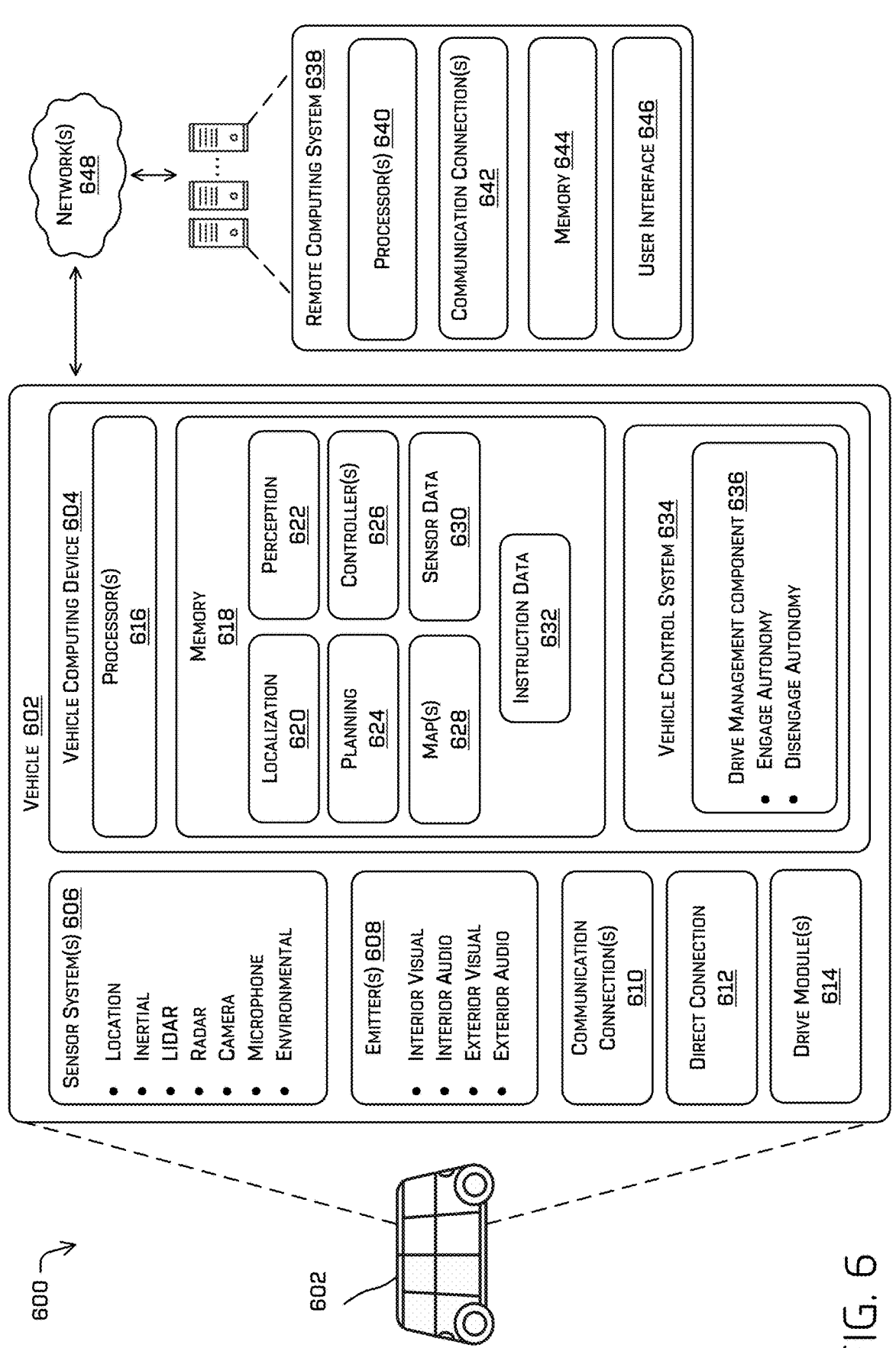
FIG. 6 depicts a block diagram of an example system for implementing the techniques described herein, in accordance with embodiments of the disclosure.

FIG. 6 depicts a block diagram of an example system 600 for implementing the techniques described herein, in accordance with embodiments of the disclosure. In at least one example, the system 600 can include a vehicle 602 (which may represent, and/or be similar to, the autonomous vehicle 102 in FIG. 1, the autonomous vehicle 202 in FIG. 2A and FIG. 2B, the autonomous vehicle 302 in FIG. 3, the autonomous vehicle 402 in FIGS. 4A-C, and/or the autonomous vehicle 502 in FIG. 5A and FIG. 5B). The vehicle 602 can include a vehicle computing device 604, one or more sensor systems 606, one or more emitters 608, one or more communication connections 610, at least one direct connection 612, and one or more drive modules 614.

The vehicle computing device 604 can include one or more processors 616 and a memory 618 communicatively coupled with the one or more processors 616. In the illustrated example, the vehicle 602 is an autonomous vehicle. However, the vehicle 602 may be any other type of vehicle (e.g., a manually driven vehicle, a semi-autonomous vehicle, etc.), or any other system having at least an image capture device. In the illustrated example, the memory 618 of the vehicle computing device 604 stores a localization component 620, a perception component 622, a planning component 624, one or more system controllers 626, and one or more maps 628. Though depicted in FIG. 6 as residing in the memory 618 for illustrative purposes, it is contemplated that the localization component 620, the perception component 622, the planning component 624, the one or more system controllers 626, and/or the one or more maps 628 can additionally, or alternatively, be accessible to the vehicle 602 (e.g., stored on, or otherwise accessible by, memory remote from the vehicle 602).

In at least one example, the localization component 620 can include functionality to receive sensor data 630 (which may represent, and/or be similar to, the sensor data collected by the sensor(s) 114 in FIG. 1) from the sensor system(s) 606 and to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the vehicle 602 within the map. In some instances, the localization component 620 can utilize SLAM (simultaneous localization and mapping), CLAMS (calibration, localization, and mapping, simultaneously), relative SLAM, bundle adjustment, non-linear least squares optimization, or the like to receive image data, lidar data, radar data, IMU data. GPS data, wheel encoder data, and the like to accurately determine a location of the vehicle 602. In some instances, the localization component 620 can provide data to various components of the vehicle 602 to determine an initial position of the vehicle 602 for generating a candidate trajectory, as discussed herein.

In some instances, the perception component 622 can include functionality to perform object detection, segmentation, and/or classification. In some instances, the perception component 622 can provide processed sensor data 630 that indicates a presence of an object that is proximate to the vehicle 602 and/or a classification of the object as an object type (e.g., car, pedestrian, cyclist, animal, building, tree, road surface, curb, sidewalk, unknown, etc.). In additional and/or alternative examples, the perception component 622 can provide processed sensor data 630 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, the presence of another object in the environment, a state of another object in the environment, a time of day, a day of a week, a season, a weather condition, an indication of darkness/light, etc.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 624 can generate an instruction for guiding the vehicle 602 along at least a portion of the route from the first location to the second location. In at least one example, the planning component 624 can determine how to guide the vehicle 602 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 602 to navigate.

In at least one example, the planning component 624 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 602 can stop to pick up a passenger. In at least one example, the planning component 624 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In some instances, the planning component 624 includes functionality to use instruction data 632 sent by the remote computing system 104. For example, the instruction data 632 may represent an instruction for the vehicle 602 to park at a parking spot or a pick-up or drop-off location. For another example, the instruction data 632 may represent a release request for the vehicle 602 to exit a stationary state. As another example, the instruction data 632 may represent a mission for the autonomous vehicle 602 to perform. As another example, the instruction data 632 may represent a disengage request instructing the vehicle 602 to disengage autonomy. As another example, the instruction data 632 may represent an engage request instructing the vehicle 602 to engage autonomy. As another example, the instruction data 632 may represent a re-engage request instructing the vehicle 602 to re-engage autonomy.

In at least one example, the vehicle computing device 604 can include one or more system controllers 626, which can be configured to control steering, propulsion, braking, safety, emitters, communication, and other systems of the vehicle 602. The system controller(s) 626 can communicate with and/or control corresponding systems of the drive module(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like), spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps 628 can include at least one map (e.g., images and/or a mesh). In some example, the vehicle 602 can be controlled based at least in part on the map(s) 628. That is, the map(s) 628 can be used in connection with the localization component 620, the perception component 622, and/or the planning component 624 to determine a location of the vehicle 602, identify entities in an environment, and/or generate routes and/or trajectories to navigate within an environment.

The memory 618 can further include a vehicle control system 634, which is configured to control commands to the vehicle platform. The vehicle control system 634 can be further configured to check one or more conditions (e.g., whether the vehicle 602 meets a set of safety criteria, whether the vehicle 602 is free of faults that prevent autonomy, and whether a disengage/engage/re-engage request is valid). Note that such conditions are examples rather than limitations, and there can be other conditions to be checked. The vehicle control system 634 can be further configured to reject or pass the disengage/engage/re-engage request based on whether the conditions are met. The vehicle control system 634 can be further configured to send feedback messages to the remote computing system 638 to indicate the reason why the disengage/engage/re-engage request is rejected. The vehicle control system 634 can be further configured to send confirmation messages to the remote computing system 638 to confirm that the vehicle 602 has successfully disengage/engage/re-engage autonomy.

The vehicle control system 634 can include a drive management component 636. The drive management component 218 can be configured to cause the vehicle 602 to engage autonomy or disengage autonomy. For example, the drive management component 636 of the vehicle control system 634 can cause the vehicle 602 to disengage autonomy, i.e., to exit the autonomous drive state and transitions to a drive inactive state, where electronic parking brakes (EPBs) can be applied and the drive gear of the vehicle 602 shifts to park. As another example, the drive management component 636 of the vehicle control system

634 can cause the vehicle 602 to engage autonomy, i.e., to exit the drive inactive state and transitions to autonomous drive state.

In some instances, aspects of some or all of the components discussed herein can include any models, algorithms, and/or machine learning algorithms. For example, in some instances, the components in the memory 618 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAID), decision stump, conditional decision trees), Bayesian algorithms (e.g., naïve Bayes. Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN). Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit. Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

As discussed above, in at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally or alternatively, the sensor system(s) 606 can send the sensor data 630, via the one or more network(s) 648, to a remote computing system 638 at a particular frequency, after a lapse of a predetermined period of time, upon occurrence of one or more conditions, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive module(s) 614. Also, the communication connection(s) 610 can allow the vehicle 602 to communicate with other nearby computing device(s) (e.g., other nearby vehicles, traffic signals, etc.). The communications connection(s) 610 also enable the vehicle 602 to communicate with the remote computing devices (e.g., the remote computing system 638) or other remote services.

The communications connection(s) 610 can include physical and/or logical interfaces for connecting the vehicle computing device 604 to another computing device or a network, such as network(s) 648. For example, the communications connection(s) 610 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

In at least one example, the vehicle 602 can include one or more drive modules 614. In some instances, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive module(s) 614 can include one or more sensor systems to detect conditions of the drive module(s) 614 and/or the surroundings of the vehicle 602. By way of example and not limitation, the sensor system(s) 606 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect entities in the surroundings of the drive module, lidar sensors, radar sensors, etc. Some sensors, such as the wheel encoders can be unique to the drive module(s) 614. In some cases, the sensor system(s) 606 on the drive module(s) 614 can overlap or supplement corresponding systems of the vehicle 602 (e.g., sensor system(s) 606).

The drive module(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 can include a drive module controller which can receive and preprocess the sensor data 630 from the sensor system(s) 606 and to control operation of the various vehicle systems. In some instances, the drive module controller can include one or more processors and memory communicatively coupled with the one or more processors. The memory can store one or more modules to perform various functionalities of the drive module(s) 614. Furthermore, the drive module(s) 614 also include one or more communication connection(s) that enable communication by the respective drive module with one or more other local or remote computing device(s).

In at least one example, the direct connection 612 can provide a physical interface to couple the one or more drive module(s) 614 with the body of the vehicle 602. For example, the direct connection 612 can allow the transfer of energy, fluids, air, data, etc. between the drive module(s) 614 and the vehicle 602. In some instances, the direct connection 612 can further releasably secure the drive module(s) 614 to the body of the vehicle 602.

As further illustrated in FIG. 6, the remote computing system 638 can include processor(s) 640, communication connection(s) 642, and memory 644. The processor(s) 616 of the vehicle 602 and/or the processor(s) 640 of the remote computing system 638 (and/or other processor(s) described herein) can be any suitable processor capable of executing instructions to process data and perform operations as described herein. By way of example and not limitation, the processor(s) 616 and 640 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 618 and the memory 644 (and/or other memory described herein) are examples of non-transitory computer-readable media. The memory 618 and the memory 644 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The remote computing system 638 can include a user interface 646. The user interface 646 may include one or more displays configured to provide the teleoperator with data related to the operation of the vehicle 602. For example, the display(s) may be configured to show content (e.g., image(s)) related to the sensor data received from the vehicle 602. The user interface 646 may also include a teleoperator input device configured to allow the teleoperator to provide information to the vehicle 602, for example, in the form of teleoperation instructions providing guidance to the vehicle 602. For example, the teleoperator may send disengage/engage/re-engage requests to the vehicle 602 via the user interface 646.

It should be noted that while FIG. 6 is illustrated as a distributed system, in alternative examples, components of the vehicle 602 can be associated with the remote computing system 638, and/or components of the remote computing system 638 can be associated with the vehicle 602. That is, the vehicle 602 can perform one or more of the functions associated with the remote computing system 638, and vice versa.

Figure 7:
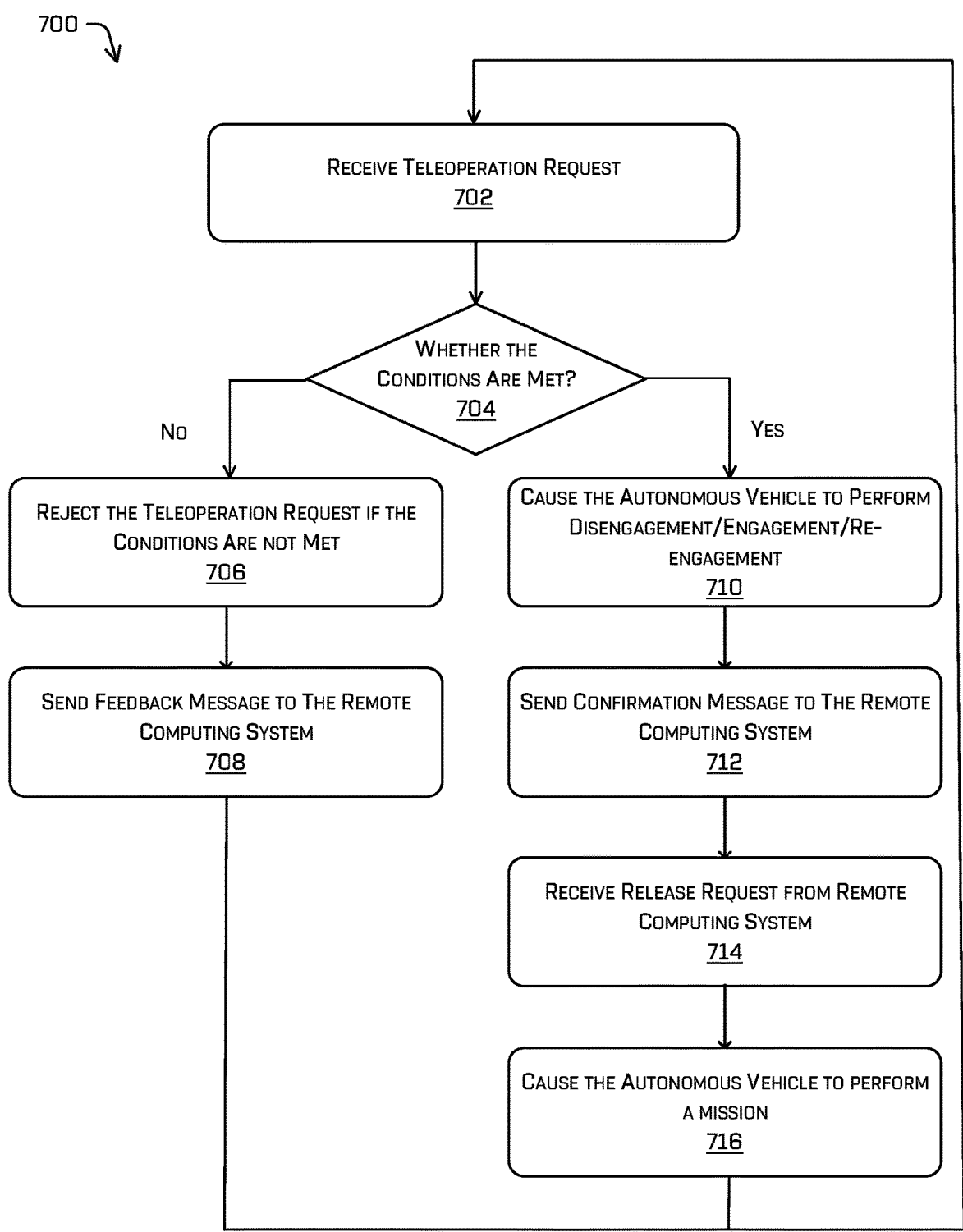
FIG. 7 depicts an example process for processing teleoperation requests, in accordance with embodiments of the present disclosure.

FIG. 7 depicts an example process 700 for processing teleoperation requests, in accordance with embodiments of the present disclosure. The process is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

At operations 702, the process 700 may receive a teleoperation request from a remote computing system. For instance, the teleoperation request may include a disengage request, an engage request, and/or a re-engage request. The disengage request may require the autonomous vehicle to disengage autonomy. The engage request may require the autonomous vehicle to engage autonomy. The re-engage request may require the autonomous vehicle to re-engage autonomy after disengagement.

As a first example, the autonomous vehicle may receive a disengage request while the autonomous vehicle is in autonomy and on a mission. As a second example, the autonomous vehicle may receive a disengage request while the autonomous vehicle is in autonomy but not on a mission. As a third example, the autonomous vehicle may receive an engage request while the autonomous vehicle is not in autonomy and not on a mission. As a fourth example, the autonomous vehicle may receive a re-engage request while the autonomous vehicle is on a mission but disengaged due to some faults.

At operation 704, the process 700 may include determining whether conditions are met. For example, the conditions can include but are not limited to, whether the autonomous vehicle meets a set of safety criteria, whether the engage request, disengage request, or re-engage request are valid, whether a teleoperator has the authority to perform remote operations on the autonomous vehicle, whether the autonomous vehicle is free of faults that prevent autonomy, or the like.

At operations 706, the process 700 may include rejecting the teleoperation request if the conditions are not met. If any of these conditions are not met (e.g., the autonomous vehicle does not meet the set of safety criteria, or there are faults that prevent autonomy, or the re-engage request is not valid), the autonomous vehicle can reject the teleoperation request.

At operation 708, the process 70) may include sending a feedback message to the remote computing system. The feedback message may indicate the reason why the teleoperation request is rejected. For example, the feedback message may indicate that the reason for the teleoperation request to be rejected is that the teleoperation request is not valid. As another example, the feedback message may indicate that the reason for the teleoperation request to be rejected is that there are faults that prevent autonomy and/or what the faults are. As another example, the feedback message may indicate that the reason for the teleoperation request to be rejected is that the autonomous vehicle does not meet the set of safety criteria. In at least some examples, such feedback may further comprise sensor information, vehicle state information (e.g., position, velocity, state of charge, whether executing a mission, etc.), vehicle component/subcomponent status messages (temperature readings, voltage readings, measured output signals, statuses, etc.), or the like.

At operation 710, the process 700 may include causing the autonomous vehicle to perform disengagement/engagement/re-engagement if the conditions are met. If all of the conditions are met (e.g., the teleoperation request is valid, and there are no faults that prevent autonomy, and the autonomous vehicle meets a set of safety criteria), an vehicle control system of the autonomous vehicle can perform disengagement/engagement/re-engagement of autonomy based at least in part on the teleoperation request. For example, a drive management component of the vehicle control system can cause the autonomous vehicle to disengage autonomy, i.e., to exit the autonomous drive state and transition to a drive inactive state, where electronic parking brakes (EPBs) can be applied and the drive gear of the autonomous vehicle shifts to park. As another example, the drive management component of the vehicle control system can cause the autonomous vehicle to engage autonomy, i.e., to exit the drive inactive state and transition to an autonomous drive state.

In some examples, if the conditions are satisfied, the drive management component of the vehicle control system can transition from an inactive driving state to an engage drive state first, and then transition from engage drive state to an autonomous control drive state. In some examples, the engage drive state can include a series of sub-states that bring the autonomous vehicle into a drive-ready mode before transitioning to the active drive state, such as bringing the power state up to high-voltage and putting all electronic control units (ECUs) into an active mode. In some examples, transitions from the inactive drive state to the engage state and then to autonomous control could take multiple seconds, for example, 10 seconds, or the like.

At operation 712, the process 700 may include sending a confirmation message to the remote computing system. For instance, after performing the disengagement/engagement/re-engagement of autonomy, the vehicle control system of the autonomous vehicle can send a confirmation message to the remote computing system, indicating that the autonomous vehicle has disengaged/engaged/re-engaged autonomy successfully.

At operation 714, the process 700 may include receiving a release request from the remote computing system. The release request may require the autonomous vehicle to start a mission. For instance, when the teleoperation request is an engage/re-engage request, the vehicle control system of the autonomous vehicle can cause the autonomous vehicle to engage/re-engage autonomy to remain in a constant state (e.g., stationary) until receiving the release request sent by the teleoperator, improving the safety of the operation of the autonomous vehicle.

As described above, the remote computing system can include one or more displays configured to provide the teleoperator with data related to the operations of the autonomous vehicle. For example, the displays may be configured to show content related to sensor data received from the autonomous vehicle, content related to the road network, and/or additional content or information to facilitate providing assistance to the autonomous vehicle. At the end of the remote computing system, the teleoperator may make a decision that it is safe for the autonomous vehicle to start the mission and send the release request to the autonomous vehicle.

At operation 716, the process 700 may include causing the autonomous vehicle to perform a mission. For example, if the teleoperation request is a re-engage request, an vehicle control system of the autonomous vehicle can cause the autonomous vehicle 502 to continue performing the mission that has been interrupted by a disengagement after receiving the release request. For example, the autonomous vehicle 502 may continue the mission (e.g., from one location to another location) that has been interrupted.

In some instances, the process 700 can go back to operation 702 such that the autonomous vehicle can receive another teleoperation request. For example, after disengaging autonomy, the autonomous vehicle may receive a re-engage request from the remote computing system. As another example, after engaging autonomy, the autonomous vehicle may receive a disengage request from the remote computing system.

EXAMPLE CLAUSES

Any of the example clauses in this section may be used with any other of the example clauses and/or any of the other examples or embodiments described herein.

A: An autonomous vehicle comprising: one or more sensors; one or more processors; and non-transitory memory storing instructions that, when executed by the one or more processors, configure the autonomous vehicle to perform operations comprising: receiving a request from a remote computing system associated with a remote operator, to transition between a first state and a second state, the first state associated with at least a portion of autonomous functionality associated with the vehicle being active, and the second state associated with the portion of autonomous functionality being inactive; determining whether the request is valid; determining whether the autonomous vehicle meets a set of safety criteria; upon determining that the request is valid and the set of safety criteria is met, causing the autonomous vehicle to transition between the first state and the second state; sending a first message to the remote computing system indicating whether the autonomous vehicle has transitioned between the first state to the second state; and causing the autonomous vehicle to operate in accordance with the second state.

B: The autonomous vehicle as recited in paragraph A, wherein determining whether the request is valid comprises determining whether data included in the disengage request is corrupted by running a cyclic redundancy check (CRC) on the data included in the disengage request.

C: The autonomous vehicle as recited in either paragraph A or B, wherein determining that the autonomous vehicle is free of faults that prevent autonomy comprises determining one or more of: that a planning component of the autonomous vehicle is not functioning; that an electronic drive of the autonomous vehicle is not available; or a braking system of the autonomous vehicle is unfunctional.

D: The autonomous vehicle as recited in any one of paragraphs A-C, wherein the set of safety criteria comprises determining whether the vehicle is stationary, the operations further comprise: determining that the vehicle is moving; and causing the vehicle to perform a safe stop upon determining that the vehicle is moving.

E: The autonomous vehicle as recited in any one of paragraphs A-D, wherein the request further includes a guidance message comprising controls for the autonomous vehicle to perform prior to transitioning between the first and second states.

F: A method comprising: receiving a request from a remote computing system for a vehicle to transition between a first state and a second state, the first state associated with an active autonomous function and the second state associated with an inactive autonomous function; determining whether the request is valid; determining whether a set of safety criteria associated with the vehicle are met; upon determining that the disengage request is valid and the set of safety criteria are met, causing the vehicle to transition between the first and second states; and sending a message to the remote computing system indicating whether the vehicle transitioned between the first and second states.

G: The method as recited in paragraph F, wherein determining whether the request is valid comprises determining whether data included in the request is corrupted by running a cyclic redundancy check (CRC) on the data included in the request.

H: The method as recited in either paragraph F or G, wherein the message further comprises one or more of: status information associated with a component of the vehicle, a fault associated with the vehicle, the validity, or whether the set of safety criteria is met.

I: The method as recited in any one of paragraphs F-H, wherein the set of safety criteria comprises determining whether the vehicle is stopped, the method further comprising: determining the vehicle is in motion; and causing the vehicle to perform a safe stop upon determining that the vehicle is in motion.

J: The method as recited in any one of paragraphs F-I, wherein the request includes a guidance message including information for the vehicle to move to a location prior to transitioning between the first and second states.

K: The method as recited in any one of paragraphs F-J, wherein the request includes a control to perform prior to transitioning between the first and second states.

L: The method as recited in any one of paragraphs F-K, further comprising: determining a fault associated with the vehicle; and receiving an additional signal from the remote computing system, the additional signal being configured to resolve the fault.

M: The method as recited in any one of paragraphs F-L, wherein the message indicates that the vehicle has re-engaged autonomy, the method further comprising: receiving a release request from the remote computing system; and upon receiving the release request, causing, based at least in part on the release request, the autonomous vehicle to execute a mission.

N: The method as recited in any one of paragraphs F-M, further comprising: upon determining that the request is invalid, or that the set of criteria is not met, sending a feedback message to the remote computing system, the feedback message including a reason for rejection.

O: The method as recited in any one of paragraphs F-N, further comprising: determining that there are faults that prevent the vehicle to transition between the first and second states; receiving, from the remote computing system, instructions for solving the faults, and sending a feedback message to the remote computing system, the feedback message indicating that the faults are resolved.

P: A non-transitory computer-readable media storing instructions that, when executed by one or more processors, cause one or more computing devices to perform operations comprising: receiving a request from a remote computing system for a vehicle to transition between a first state and a second state, the first state associated with an active autonomous function and the second state associated with an inactive autonomous function; determining whether the request is valid; determining whether a set of safety criteria associated with the vehicle are met; upon determining that the disengage request is valid and the set of safety criteria are met, causing the vehicle to transition between the first and second states; and sending a message to the remote computing system indicating whether the vehicle transitioned between the first and second states.

Q: The non-transitory computer-readable media as recited in paragraph P, wherein determining whether the request is valid comprises determining whether data included in the request is corrupted by running a cyclic redundancy check (CRC) on the data included in the request.

R: The non-transitory computer-readable media as recited in either paragraph P or Q, wherein the message further comprises one or more of: status information associated with a component of the vehicle, a fault associated with the vehicle, the validity, or whether the set of safety criteria are met.

S: The non-transitory computer-readable media as recited in any one of paragraphs P-R, the operations further comprise: causing the vehicle to a safe stop upon determining that the vehicle is not stationary.

T: The non-transitory computer-readable media as recited in any one of paragraphs P-S, wherein the set of safety criteria comprises determining whether the vehicle is stopped, the method further comprising: determining the vehicle is in motion, and causing the vehicle to perform a safe stop upon determining that the vehicle is in motion.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes, or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
one or more sensors;
one or more processors; and
non-transitory memory storing instructions that, when executed by the one or more processors, configure the autonomous vehicle to perform operations comprising:
receiving a request from a remote computing system associated with a remote operator to transition between a first state and a second state, the first state associated with at least a portion of autonomous functionality associated with the autonomous vehicle being active, and the second state associated with the portion of the autonomous functionality being inactive, wherein the request includes guidance data comprising first data indicating controls that assist the autonomous vehicle in performing a safe stop prior to transitioning from the first state to the second state and second data indicating a location in an environment to stop;
determining whether the request is valid;
determining whether the autonomous vehicle meets a set of safety criteria;
upon determining that the request is valid and the set of safety criteria is met, causing the autonomous vehicle to transition between the first state and the second state;

32 sending a first message to the remote computing system indicating whether the autonomous vehicle has transitioned between the first state to the second state; and
causing the autonomous vehicle to operate in accordance with the second state.

2. The autonomous vehicle as recited in claim 1, wherein determining whether the request is valid comprises determining whether the guidance data included in the request is corrupted by running a cyclic redundancy check on the guidance data included in the request.

3. The autonomous vehicle as recited in claim 1, the operations further comprising:
determining that the autonomous vehicle has a fault that affects autonomy, wherein determining that the autonomous vehicle has the fault comprises determining one or more of:
that a planning component of the autonomous vehicle is not functioning;
that an electronic drive of the autonomous vehicle is not available; or
a braking system of the autonomous vehicle is unfunctional.

4. The autonomous vehicle as recited in claim 1, wherein the set of safety criteria comprises determining whether the autonomous vehicle is stationary, the operations further comprise:
determining that the autonomous vehicle is moving; and
causing the autonomous vehicle to perform the safe stop upon determining that the autonomous vehicle is moving.

5. The autonomous vehicle as recited in claim 1, wherein the second state comprises a drive inactive state.

6. The autonomous vehicle as recited in claim 1, wherein determining whether the request is valid comprises determining that the request is received from a teleoperator that is authorized to transmit instructions to the autonomous vehicle, wherein only one teleoperator is authorized to transmit the instructions to the autonomous vehicle at a time.

7. A method comprising:
receiving a request from a remote computing system for a vehicle to transition between a first state and a second state;
determining that the request is valid;
determining that a set of safety criteria are not met in part by determining that the vehicle has a fault associated with a component that is associated with an autonomous function;
sending a first message to the remote computing system indicating that the vehicle has the fault associated with the component that affects autonomy;
receiving, from the remote computing system, instructions configured to resolve the fault;
causing the vehicle to perform the instructions configured to resolve the fault;
sending a second message to the remote computing system indicating the vehicle resolved the fault;
determining, based in part on the vehicle resolving the fault, that the set of safety criteria associated with the vehicle are met;
upon determining that the set of safety criteria are met, causing the vehicle to transition between the first state and the second state; and
sending a third message to the remote computing system indicating that the vehicle transitioned between the first state and the second state.

8. The method as recited in claim 7, wherein determining whether the request is valid comprises determining whether data included in the request is corrupted by running a cyclic redundancy check on the data included in the request.

9. The method as recited in claim 7, wherein the first message further comprises data indicating one or more of:

status information associated with the component of the vehicle, or the fault associated with the vehicle.

10. The method as recited in claim 7, wherein the set of safety criteria comprises determining whether the vehicle is stopped, the method further comprising:

determining the vehicle is in motion; and causing the vehicle to perform a safe stop upon determining that the vehicle is in motion.

11. The method as recited in claim 7, wherein the request includes a guidance message including information for the vehicle to move to a location prior to transitioning between the first state and the second state.

12. The method as recited in claim 7, wherein the request includes a control to perform prior to transitioning between the first state and the second state.

13. The method as recited in claim 7, wherein the third message indicates that the vehicle has re-engaged autonomy, the method further comprising:

receiving a release request from the remote computing system; and upon receiving the release request, causing, based at least in part on the release request, the vehicle to execute a mission.

14. The method of claim 7, wherein the fault associated with the component is at least one of a sensor malfunction or unreliable data.

15. The method of claim 7, further comprising:

prior to receiving the request from the remote computing system for the vehicle to transition between the first state and the second state, determining that the vehicle has the fault associated with the component that affects autonomy, wherein the first state is associated with at least a portion of autonomous functionality associated with the vehicle being inactive and the second state is associated with the portion of the autonomous functionality being active.

16. A non-transitory computer-readable media storing instructions that, when executed by one or more processors, cause one or more computing devices to perform operations comprising:

receiving a request from a remote computing system for a vehicle to transition between a first state and a second state, wherein the request includes guidance data comprising first data indicating controls that assist the vehicle in performing a safe stop prior to transitioning from the first state to the second state and second data indicating a location in an environment to stop;

determining whether the request is valid;

determining whether a set of safety criteria associated with the vehicle are met;

upon determining that the request is valid and the set of safety criteria are met, causing the vehicle to transition between the first state and the second state; and sending a message to the remote computing system indicating whether the vehicle transitioned between the first state and the second state.

17. The non-transitory computer-readable media as recited in claim 16, wherein determining whether the request is valid comprises determining whether the guidance data included in the request is corrupted by running a cyclic redundancy check on the guidance data included in the request.

18. The non-transitory computer-readable media as recited in claim 16, wherein the message further comprises one or more of:

status information associated with a component of the vehicle, a fault associated with the vehicle, the validity, or whether the set of safety criteria are met.

19. The non-transitory computer-readable media as recited in claim 16, the operations further comprise:

causing the vehicle to perform the safe stop upon determining that the vehicle is not stationary.

20. The non-transitory computer-readable media as recited in claim 16, wherein the set of safety criteria comprises determining whether the vehicle is stopped, the operations further comprising:

determining that the vehicle is in motion; and causing the vehicle to perform the safe stop upon determining that the vehicle is in motion.

* * * * *